(12) United States Patent
Weidinger

(10) Patent No.: US 6,371,269 B1
(45) Date of Patent: *Apr. 16, 2002

(54) THRUST PLATE ASSEMBLY

(75) Inventor: Reinhold Weidinger, Unterspiesheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/573,250

(22) Filed: May 18, 2000

(30) Foreign Application Priority Data

May 18, 1999 (DE) .......................................... 199 22 724

(51) Int. Cl.$^7$ ............................................... F16D 13/75
(52) U.S. Cl. .................................. 192/70.25; 192/111 A
(58) Field of Search .......................... 192/70.25, 111 A

(56) References Cited

U.S. PATENT DOCUMENTS

| | | | |
|---|---|---|---|
| 5,320,205 A | | 6/1994 | Kummer et al. |
| 5,595,275 A | | 1/1997 | Gochenour et al. |
| 5,690,203 A | * | 11/1997 | Link et al. ............... 192/70.25 |
| 5,845,750 A | | 12/1998 | Thirion De Briel et al. |
| 5,911,293 A | | 6/1999 | Weiss et al. |
| 5,934,429 A | * | 8/1999 | Jennings .................. 192/70.25 |
| 5,975,268 A | * | 11/1999 | Weidinger et al. ....... 192/70.25 |
| 5,984,067 A | * | 11/1999 | Weidinger et al. ....... 192/70.25 |
| 6,029,788 A | * | 2/2000 | Weidinger et al. ....... 192/70.25 |
| 6,109,412 A | * | 8/2000 | Cole et al. ............... 192/70.25 |
| 6,116,396 A | * | 9/2000 | Mischler .................. 192/70.25 |
| 6,123,180 A | * | 9/2000 | Weidinger ............... 192/70.25 |
| 6,202,817 B1 | * | 3/2001 | Link et al. ............... 192/70.25 |

FOREIGN PATENT DOCUMENTS

| | | | |
|---|---|---|---|
| DE | 198 16 519 C1 | * | 1/2000 |
| DE | 199 41 208 | | 3/2001 |
| FR | 2 746 153 | | 4/1999 |
| GB | 2 353 820 | | 3/2001 |

* cited by examiner

*Primary Examiner*—Rodney H. Bonck
(74) *Attorney, Agent, or Firm*—Cohen, Pontani, Lieberman & Pavane

(57) ABSTRACT

A thrust plate subassembly comprises a play indicator arrangement that includes: a blocking/detection element which is mounted on the one component and which is prestressed with a blocking portion against the wear-adjusting device and acts upon the wear-adjusting device to prevent a movement of the at least one wear-adjusting element in the wear-adjusting direction. A detection portion of the detection element is in or is capable of being brought into interaction with another component or subassembly displaceable relative to the one component on the occurrence of wear, for the purpose of detecting the wear. On the occurrence of wear the blocking/detection element being capable of being brought, as a result of the interaction with the other component, into a position for releasing the at least one adjusting element for the purpose of movement in the adjusting direction. Furthermore, a detaining element is provided, by which, when the blocking/detection element is brought into its position for releasing the at least one adjusting element, the blocking/detection element is capable of being detained against movement in its prestressing direction.

40 Claims, 14 Drawing Sheets

THRUST PLATE ASSEMBLY

BACKGROUND OF THE INVENTION

1. Field of the Invention

The present invention relates to a thrust plate subassembly, in particular for a motor vehicle friction clutch with automatic wear compensation comprising a housing which is fixable or fixed to a flywheel for joint rotation about an axis of rotation, a pressure plate arranged essentially fixedly in terms of rotation in the housing and axially displaceable relative to the latter, a force accumulator, preferably diaphragm spring, which is supported on the housing, on the one hand, and on the pressure plate, on the other hand, and presses the pressure plate in the direction of a side of the housing which is provided for connection to the flywheel, a wear-adjusting device arranged in the support path of the force accumulator between the force accumulator and one component of housing and pressure plate and having at least one adjusting element displaceable for wear compensation and prestressed in a wear-adjusting direction, and at least one play indicator arrangement for detecting a wear of friction linings of a clutch disk clampable or clamped between the pressure plate and the flywheel, the play indicator arrangement comprising: a blocking/detection element which is mounted on the one component and which is prestressed with a blocking portion against the wear-adjusting device and acts upon the latter, in order to prevent a movement of the at least one wear-adjusting element in the wear-adjusting direction, and a detection portion of which is in or is capable of being brought into interaction with another component or subassembly displaceable relative to the one component on the occurrence of wear, for the purpose of detecting the wear, on the occurrence of wear the blocking/detection element being capable of being brought, as a result of the interaction with the other component or subassembly, into a position for releasing the at least one adjusting element for the purpose of movement in the wear-adjusting direction.

2. Discussion of the Prior Art

The prior art discloses a thrust plate arrangement constructed in this way, in which the play indicator arrangement is designed as follows: an axial passage orifice is provided in the pressure plate through which a pinlike detection portion of a play indicator passes. The pinlike detection portion is slightly tiltable in the passage orifice. Attached firmly to that end of the pinlike detection portion which is located at a distance from the flywheel is a leaf spring element which extends in the direction of the wear-adjusting device, so that the wear-adjusting device is clamped between the pressure plate and the leaf spring element. By the leaf spring element being supported on the wear-adjusting device, due to the spring elasticity of said leaf spring element, the pinlike detection portion is tilted in its passage orifice and thus prestressed into a frictional clamping fit. When a wear of friction linings of a clutch disk which are located between the pressure plate and flywheel occurs, the pressure plate moves in the direction of the flywheel, until the pinlike detection portion stands up on the flywheel. At the same time, the detection portion is shifted axially in its passage orifice relative to the pressure plate counter to the prestressing action and the frictional clamping fit. That is to say, the end of the detection portion by which the latter is connected to the leaf spring element is also pushed away by the pressure plate, so that the prestressing force with which the leaf spring element acts upon the wear-adjusting device decreases. If, in a subsequent clutch disengagement operation, the action of the force of the diaphragm spring on the wear-adjusting device is reduced or released, the at least one adjusting element can move in the wear-adjusting direction, along with an increasing tension of the leaf spring element, until the prestressing force with which the at least one wear-adjusting element is prestressed in the wear-adjusting direction and the active force provided by the leaf spring element compensate one another and further movement of the at least one wear-adjusting element in the wear-adjusting direction is blocked by the leaf spring element. That is to say, in this arrangement, the play indicator, formed from the pinlike detection portion and the leaf spring element, is shifted increasingly relative to the pressure plate, and successive detensioning of the leaf spring element (during wear detection) and tensioning of the leaf spring element (during wear compensation) occurs.

In order, in an arrangement of this type, to carry out wear compensation to an extent which corresponds exactly to the wear of the friction linings which is detected by the play indicator, the spring elasticity or spring constant of the leaf spring element must be provided with the highest possible accuracy. If the leaf spring element is somewhat too soft, there is the risk that wear overcompensation will take place, and, if the leaf spring element is too rigid, there is the risk that the wear will not be sufficiently compensated for and that the interaction of the various components cannot take place in the intended way.

SUMMARY OF THE INVENTION

The object of the present invention is, therefore, to provide a thrust plate subassembly which, while being of simple design, can carry out accurate wear compensation automatically.

This object is achieved, according to the invention, by means of a thrust plate subassembly, in particular for a motor vehicle friction clutch with automatic wear compensation, comprising a housing which is fixable or fixed to a flywheel for joint rotation about an axis of rotation. A pressure plate is arranged essentially fixedly in terms of rotation in the housing and is axially displaceable relative to the housing. A force accumulator, preferably a diaphragm spring, is supported on the housing, on the one hand, and on the pressure plate, on the other hand, and presses the pressure plate in the direction of a side of the housing which is provided for connection to the flywheel. A wear-adjusting device is arranged in the support path of the force accumulator between the force accumulator and one component of the housing and the pressure plate and has at least one adjusting element displaceable for wear compensation and is prestressed in a wear-adjusting direction. At least one play indicator arrangement is provided for detecting wear of the friction linings of a clutch disk clampable or clamped between the pressure plate and the flywheel. The play indicator arrangement comprises a blocking/detection element which is mounted on the one component and which is prestressed with a blocking portion against the wear-adjusting device and acts upon the wear-adjusting device, in order to prevent a movement of the at least one wear-adjusting element in the wear-adjusting direction. A detection portion is in or is capable of being brought into interaction with another component or subassembly displaceable relative to the one component on the occurrence of wear, for the purpose of detecting the wear. Upon the occurrence of wear the blocking/detection element is capable of being brought, as a result of the interaction with the other component or subassembly, into a position for releasing the at least one adjusting element for the purpose of movement in the wear-adjusting direction.

In the thrust plate subassembly according to the invention, there is provided, furthermore, a detaining element, by means of which, when the blocking/detection element is brought into its position for releasing the at least one adjusting element, the blocking/detection element is capable of being detained against movement in its prestressing direction.

The construction according to the invention of the thrust plate subassembly allows operation on the following functional principle: on the occurrence of wear, the blocking/detection element is first brought, as a result of interaction of the detection portion with the other component or subassembly, into a position in which it does not act upon the wear-adjusting device, and therefore the at least one adjusting element is released for movement in the wear-adjusting direction. With the clutch engaged, however, the wear-adjusting device, and therefore also the at least one adjusting element, is initially still acted upon by the diaphragm spring and therefore cannot carry out a compensating movement. This is possible only during a subsequent clutch disengagement operation, during which the wear-adjusting device is released by the diaphragm spring. However, since, during a clutch disengagement operation of this kind, a movement generally occurs between one component and the other, which will result in the blocking/detection element being moved out of the position described above, the detaining element is provided, which now provides detention for the blocking/detection element and ensures that an interspace produced between the wear-adjusting device and the blocking portion as a result of interaction of the detection portion with the other component is filled again due to the fact that the at least one adjusting element moves in the wear-adjusting direction, not due to the fact that the blocking/detection element moves back into its initial position again.

In a construction of this kind, it becomes possible for the blocking/detection element to be designed, in terms of the prestressing force provided for it, so that in every operating state, that is to say every state of wear, this force is always sufficient to prevent unintended wear compensation in the event of action taken on the wear-adjusting device. That is to say, the blocking/detection element may, in principle, be prestressed against the wear-compensating device with a force which is markedly higher than that force by which the at least one wear-adjusting element is prestressed for the purpose of movement in the wear-adjusting direction. This becomes possible since the provision of the detaining element avoids the need to ensure a force equilibrium between these two forces.

In the thrust plate subassembly according to the invention, there is preferably provision for the blocking/detection element to be mounted essentially fixedly in one end region on the one component and to be prestressed by spring force against the at least one adjusting element.

An extremely simple construction with a reliable effect can be obtained if the blocking/detection element is a spring element, preferably a leaf spring element.

So that a reliable operation of the detaining element can be provided, in one embodiment of the invention the detaining element is prestressed in a direction for detaining the blocking/detection element.

For example, the detaining element may be of essentially wedgelike design and may be supported with a first wedge face on the one component and detain the blocking/detection element with a second wedge face.

Alternatively, there may be provision for the detaining element to comprise a catch element with catch projections, preferably a sawtooth-shaped toothing, which prevents a movement of the blocking/detection element in its prestressing direction and allows a movement opposite to the prestressing direction.

A construction which can be produced in a particularly simple way is obtained if the one component comprises the pressure plate. In this case, the other component preferably comprises the housing.

In an embodiment of this kind, the housing may then have provided on it an interaction portion, against which the detection portion of the blocking/detection element can come to bear when wear occurs.

In the thrust plate subassembly according to the invention, the number of parts can be kept small if the interaction portion is formed by a surface region of the housing.

Alternatively, however, it is possible for the housing to have mounted on it an interaction element which has an interaction portion.

An embodiment of this kind is particularly preferred, since it can be used at the same time for providing transport protection. Transport protection is intended, within the meaning of the present invention, to refer to protection against unintentional wear compensation taking place during the transport of the thrust plate subassembly according to the invention, that is to say before the latter is assembled together with a flywheel or other components. For this purpose, for example, the interaction element may be capable of being arranged on the housing in a first position, in which the interaction portion cannot come into interaction with the detection portion, and of being arranged in a second position, in which the interaction portion can come into interaction with the detection portion.

In a further alternative embodiment, the other component may comprise the flywheel.

In order to ensure, for example when maintenance work is carried out or during transport, before the thrust plate subassembly is connected to a flywheel or the like, that an excessive shift of the blocking/detection element subsequently leads to a correspondingly large wear-compensating movement, it is proposed, furthermore, that a maximum regulating-travel limiting arrangement be provided for the detaining element.

In this case, the maximum regulating-travel limiting arrangement may comprise a blocking element, preferably a blocking projection, on the detaining element and a counterblocking element, preferably a blocking recess, on the at least one wear-adjusting element.

In one embodiment of the thrust plate subassembly according to the invention, there may be provision for arranging the blocking/detection element so as to extend essentially radially.

For example, the blocking/detection element may be mounted with a radially inner region on the one component, and the detection portion and/or the blocking portion may be provided in a radially outer region of the blocking/detection element.

In an alternative embodiment, there may be provision for arranging the blocking/detection element so as to extend essentially in the circumferential direction. Particularly when a blocking/detection element is used which is composed of spring material and has to have a specific minimum length in order to allow it to execute a sufficient deformation travel. The advantage of a configuration of this kind is that less radial construction space is taken up, so that, when a pressure plate forms the one component, the central orifice in the latter can be larger, for example so that a clutch disk together with a torsional vibration damper or the like can be used.

In an embodiment of this type, there may be provision for the blocking/detection element to be mounted in a first circumferential end region on the one component and to have the detection portion and/or the blocking portion in a second circumferential end region.

The blocking/detection element may have a basic body portion which extends essentially in the circumferential direction and from which the detection portion and/or the blocking portion project/projects essentially radially in the second circumferential end region.

In order, furthermore, to prevent the blocking/detection element from rotating relative to that component on which it is mounted, a rotation securing arrangement may also be provided, for securing the blocking/detection element against rotation relative to the one component.

The rotation securing arrangement may comprise, for example, a securing portion which is provided on one end region of the blocking/detection element and which interacts with a countersecuring portion on the one component.

In friction clutches in which, as described above, the compensation of wear occurring in the region of the friction linings of the clutch disk can be carried out automatically by means of the displacement of any components of a wear-adjusting device, there is basically the problem that, when, for example after the friction linings have been worn away completely, the clutch disk is replaced by a new clutch disk with unworn friction linings, various components in the region of the wear-adjusting device are not in a position which corresponds to such a new unworn state of the friction linings. This may present the problem that the force accumulator, that is to say, for example, a diaphragm spring, may not work in the desired position range during subsequent operation and there is therefore a correspondingly undesirable spring characteristic. In order to counteract this problem, according to a further aspect of the present invention, a thrust plate subassembly, in particular for a motor vehicle friction clutch with automatic wear compensation, is proposed, which comprises:

a housing which is fixable or fixed to a flywheel for joint rotation about an axis of rotation, a pressure plate arranged essentially fixedly in terms of rotation in the housing and displaceable axially relative to the housing, a force accumulator, preferably a diaphragm spring, which is supported on the housing, on the one hand, and on the pressure plate, on the other hand, and presses the pressure plate in the direction of a side of the housing which is provided for connection to the flywheel, a wear-adjusting device arranged in the support path of the force accumulator between the force accumulator and one component of the housing and the pressure plate and having at least one adjusting element displaceable for wear compensation and prestressed in a wear-adjusting direction, and at least one play indicator arrangement for detecting wear of friction linings of a clutch disk clampable or clamped between the pressure plate and the flywheel.

This thrust plate subassembly has, furthermore, a resetting arrangement, by means of which the wear-adjusting device is capable of being brought into a position which corresponds to a state of lower wear.

It is thereby possible to ensure that, when the entire clutch or thrust plate subassembly is restored to a state of lower wear, for example due to the replacement of a clutch disk, the wear-adjusting device is correspondingly also put into an associated state which the wear-adjusting device assumes when the wear-relevant variable likewise has lower or no wear.

For this purpose, there may, for example, be provision for the at least one adjusting element to be capable of being brought by means of the resetting arrangement out of an initial position in a resetting direction into a position which corresponds to a state of lower wear than the initial position. Furthermore, the initial position may be a wear position which the at least one adjusting element assumes when the maximum possible wear is present, or it may be a position in the region of this wear position.

Moreover, there may be provision for the at least one adjusting element to be capable of being brought by means of the resetting arrangement into a wear-free position which the adjusting element assumes when there is no or essentially no wear. In order in a simple way to bring about resetting into a state corresponding to lower wear, the resetting arrangement may comprise at least one driving element which is capable of being set in movement by a driving member, preferably a driving tool, and the movement of which is capable of being converted into a resetting movement of the at least one adjusting element.

The interaction between the driving element and the at least one adjusting element may take place in that the at least one adjusting element has an engagement formation, preferably a toothing, which is in driving contact with a counterengagement formation, preferably a toothing, on the at least one driving element.

In a construction which acts in a particularly simple way, the at least one adjusting element comprises an adjusting ring which has a toothing at least in the region of the at least one driving element, and the at least one driving element comprises a driving gearwheel meshing with the toothing of the adjusting ring.

The at least one driving element is preferably carried on the one component.

So that resetting can also be carried out when the thrust plate subassembly is in the assembled state, it is proposed that the at least one driving element has a tool engagement formation accessible preferably from outside the thrust plate subassembly.

Furthermore, in the thrust plate subassembly according to the invention, there is preferably provision for the play indicator arrangement to comprise a blocking/detection element which is mounted on the one component and which is prestressed with a blocking portion against the wear-adjusting device and acts upon the latter, in order to prevent a movement of the at least one wear-adjusting element in the wear-adjusting direction. A detection portion of the detection element is in or is capable of being brought into interaction with another component or subassembly displaceable relative to the one component. Upon the occurrence of wear, for the purpose of detecting the wear, on the occurrence of wear the blocking/detection element is capable of being brought, as a result of the interaction with the other component, into a position for releasing the at least one adjusting element for the purpose of movement in the wear-adjusting direction, Furthermore, a detaining element is provided by means of which, when the blocking/detection element is brought into its position for releasing the at least one adjusting element, the blocking/detection element is capable of being detained against movement in its prestressing direction.

In a construction of this kind, furthermore, by means of the resetting arrangement, the detaining element is then capable of being brought preferably into a position of the latter which is assigned essentially to that position of the wear-adjusting device which the latter assumes after a resetting operation has been carried out.

This may be implemented, for example, in that, during the movement of the at least one adjusting element in the resetting direction, the detaining element is capable of being moved by means of the at least one adjusting element.

So that a simple construction as possible can be provided here, it is proposed that the at least one adjusting element or the detaining element has a take-up projection which engages with movement play in the adjusting direction or the resetting direction into a take-up recess of the other element in each case.

Furthermore, in the thrust plate according to the invention, there is preferably provision for the at least one play indicator arrangement to be capable of being brought by means of the resetting arrangement into a position which corresponds to a state of lower wear. This may be implemented in a simple way, for example, in that, by means of the resetting arrangement, the detention of the blocking/detection element against movement in its prestressing direction is capable of being canceled.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
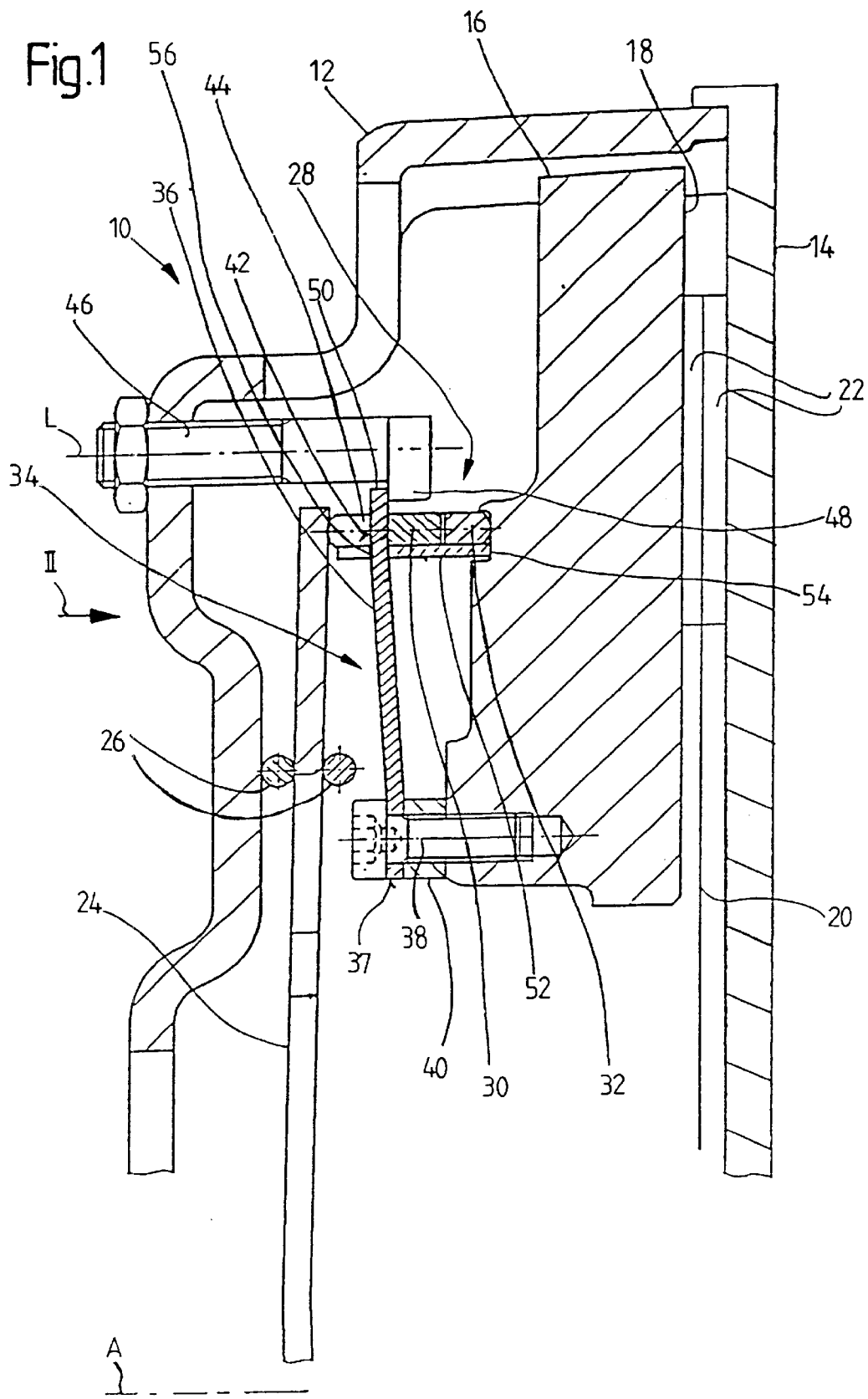
FIG. 1 shows a part view in longitudinal section of a thrust plate subassembly according to the invention.

FIG. 1 shows part of a thrust plate subassembly 10 according to the invention in longitudinal section. The thrust plate subassembly 10 comprises a housing 12 which, in a way known per se, can be assembled together with, that is to say connected fixedly in terms of rotation to, a flywheel 14 illustrated diagrammatically in FIG. 1, in order to form a motor vehicle friction clutch. The housing 12 is then rotable together with the flywheel 14 about an axis of rotation A.

Arranged in the housing 12 is a pressure plate 16 which is connected to the housing 12 so as to be displaceable in the direction of the axis of rotation A, but fixedly in terms of rotation, by means of tangential leaf springs or the like. A clutch disk 20, illustrated diagrammatically, together with its friction linings 22, is clampable, in the clutch engaged state, between a friction surface 18 of the pressure plate 16 and the flywheel 14. A diaphragm spring 24, which forms the force accumulator in the embodiment illustrated, is supported in a radially middle region on the housing by means of wire rings 26 in a way known per se, these wire rings 26, together with the diaphragm spring 24 held between them, being carried on the housing 12 by holding bolts not illustrated. The diaphragm spring 24 acts radially on the outside upon a wear-adjusting device 28, so that the wear-adjusting device 28 is pressed between the diaphragm spring 24 and the pressure plate 16 on the side of the pressure-plate 16 facing away from the flywheel 14. In the embodiment illustrated, the wear-adjusting device 28 comprises two adjusting rings 30, 32. The adjusting ring 30 is acted upon by the diaphragm spring 24 and the adjusting ring 32 lies axially between the adjusting ring 30 and the pressure plate 16. On their surface regions bearing against one another, the adjusting rings 30, 32 have, running in the circumferential direction, complementary sawtooth configurations, so that the adjusting rings 30, 32 are displaceable relative to one another in the circumferential direction by means of respective sawtooth faces bearing against one another, that is to say, during the relative rotation of the adjusting rings 30, 32, these sawtooth faces slide on one another and, by virtue of this inclined position, lead to the overall axial extent of the wear-adjusting device 28 being increased during relative rotation. The two adjusting rings 30, 32 are, in a way known per se, prestressed relative to one another in the circumferential direction, in addition to this rotation, by means of one or more springs 33.

On the pressure plate 16 is provided, furthermore, a play indicator arrangement 34 which comprises essentially a leaf spring element 36 fixed to the pressure plate 16. The leaf spring element 36 is firmly screwed in its radially inner end region 37 to the pressure plate 16 by means of a screw bolt 38 or the like, with a bearing element 40 being interposed. In particular, the connection between the leaf spring 36 and the pressure plate 16 is such that the leaf spring element 36 is held on the pressure plate 16 so as to be nonrotable, that is to say so as not to be rotable about an axis parallel to the axis of rotation A. In a radially outer region 42, which forms a blocking portion of the leaf spring element 36, the leaf spring element 36 rests on the adjusting ring 30, so that the wear-adjusting device 28 is clamped in the axial direction between the leaf spring element 36 and the pressure plate 16 by means of the spring-elastic prestressing force of the leaf spring element 36. The prestressing force of the leaf spring element 36 is selected in such a way that, irrespective of the state of wear still to be described below, this prestressing force is always sufficient to prevent a relative rotation of the adjusting rings 30, 32 as a result of the prestressing action of the spring 33.

Figure 2:
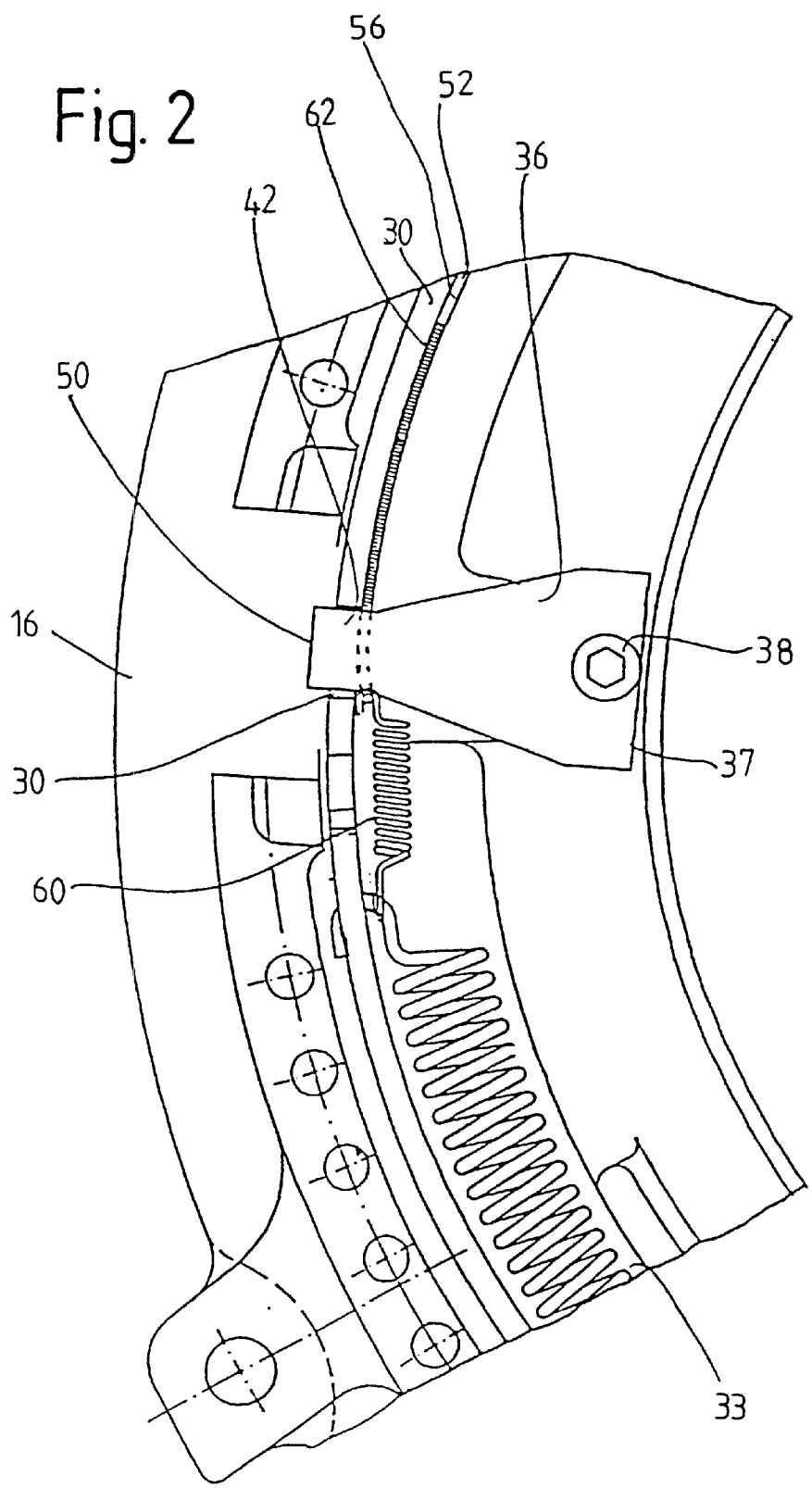
FIG. 2 shows an axial view of the thrust plate subassembly of FIG. 1 in the viewing direction II in FIG. 1, the housing being omitted for the sake of clearer illustration.

It can be seen particularly in FIGS. 1 and 2 that the leaf spring element 36 engages, in the region of its blocking portion 42, into a depression 44 of the adjusting ring 30. Consequently, due to the rotationally secure fixing of the leaf spring element 36 on the pressure plate 16, the adjusting ring 30, too, is blocked against rotation relative to the pressure plate 16. During wear compensation still to be described below, it is possible only for the adjusting ring 32 to rotate relative to the pressure plate 16, and therefore also relative to the adjusting ring 30, about the axis of rotation A.

Furthermore, the housing 12 has mounted on it an interaction bolt 46 which extends in the axial direction toward the pressure plate 16 and terminates in the region of the wear-adjusting device 28. In this end region, the interaction bolt 46 is designed eccentrically, that is to say nonrotationally symmetrically, relative to its longitudinal axis L, and has an interaction portion 48. The portion 48 is designed to interact with a detection portion 50 of the leaf spring element 36. The detection portion 50 extends in the radial direction beyond the wear-adjusting device 28.

Figure 3:
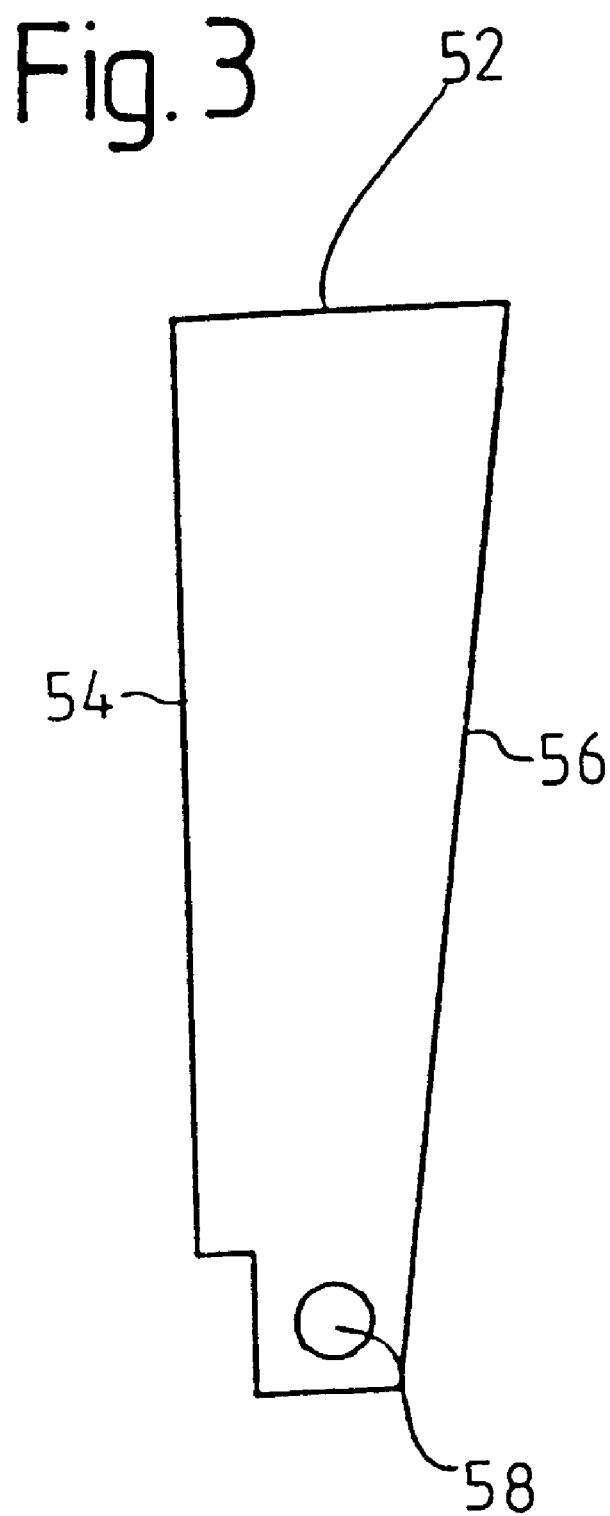
FIG. 3 shows a side view of a detaining element provided in the thrust plate subassembly according to the invention.

Between the pressure plate 16 and the leaf spring element 36 is a detaining element 52 which has an elongate wedge-like configuration, as can be seen in FIG. 3. Here, the detaining element 52 has a first wedge face 54, with which the detaining element 52 rests on the pressure plate 16 directly, radially within the wear-adjusting device 28, and extends in the circumferential direction along part of the adjusting rings 32, 30. The leaf spring element 36 comes to bear on a second wedge face 56 in a way described below. The detaining element 52 is displaceable in the circumferential direction and is under the prestress of a prestressing spring 60 which engages with an end region into an orifice 58 of the detaining element 52 and is suspended with another end region on another component, for example that end of the spring 33 with which the spring 33 is suspended on the adjusting ring 32. In the embodiment illustrated, the spring 60 is a helical tension spring. It should be pointed out that both the spring 33 and the spring 60 may be designed in each case as helical compression springs or helical tension springs.

The operation of the thrust plate subassembly 10 according to the invention when wear occurs is described below.

In a state in which the friction linings 22 of the clutch disk 20 are unworn, the detection portion 50 does not bear or bears without prestress on the interaction portion 48 of the interaction bolt 46. If, for example during a clutch engagement operation, wear of the friction linings 22 occurs, which means that the axial extent of these is reduced in the region between the pressure plate 16 and the flywheel 14, the entire pressure plate, together with the components arranged on it and the wear-adjusting device 28, moves in the axial direction toward the flywheel 14 under the prestress of the diaphragm spring 24. When the wear is sufficiently great, in this case the detection portion 50 comes to bear against the interaction portion 48 and the leaf spring element 36 is prevented, in this end region, from further movement in the axial direction, together with the pressure plate 16. If the wear is sufficiently great, the leaf spring element 36 then lifts off with its blocking portion 42 from the adjusting ring 30, so that an axial interspace between the adjusting ring 30 and the blocking portion 42 is produced. Correspondingly, the leaf spring element 36 would lift off from the wedge face 56 of the detaining element 52 if the detaining element 52 were not under the prestress of the spring 60 and, during this axial relative movement between the leaf spring element 36 in its radially outer region and the pressure plate 16, were not to be displaced in the circumferential direction until this increased axial clearance is filled again by the detaining element 52. In this state, therefore, the wear-adjusting device 28 is then no longer acted upon by the leaf spring element 36, but, due to the engaged state of the clutch, is still acted upon by the diaphragm spring 24.

Only during a subsequent clutch disengagement operation, in which, in the embodiment illustrated, the diaphragm spring 24 is moved, radially on the inside, in the direction toward the flywheel 14 and therefore, radially on the outside, away from the flywheel 14 and at the same time at least partially releases the wear-adjusting device 28, can the wear-adjusting device 28 compensate by means of the prestressing action of the spring 33, as a result of the rotation of the adjusting ring 32, the interspace which is produced between the leaf spring element 36, that is to say the blocking portion 42 of the latter, and the adjusting ring 30. During this rotation of the adjusting ring 32 the adjusting rings 30, 32 slide with their inclined faces on one another, so that the adjusting ring 30 is shifted axially until it butts against the leaf spring element 36 again. Exactly that wear is therefore compensated for which was previously detected from the lifting off of the leaf spring element 36 from the wear-adjusting device 28.

During the clutch disengagement operation, the pressure plate 16 moves away from the flywheel 14 as a result of the prestressing action of the tangential leaf springs (not shown). In this case, the detection portion 50 of the leaf spring element 36 also lifts off from the interaction portion 48 of the interaction bolt 46. Since the detaining element 52 has already been displaced beforehand into a position in which the leaf spring element 36 lifted off from the wear-adjusting device 28 prevents against movement back into the initial position resting on the wear-adjusting device 28, the wear which has occurred can, in fact, be compensated for by an increase in the axial extent of the wear-adjusting device 28.

During a subsequent clutch engagement operation, the overall axial extent of the unit, formed from the wear-adjusting device 28, the pressure plate 16 and the clutch disk 20 with the friction linings 22, between the bearing region of the diaphragm spring 24 on the adjusting ring 30 and the surface of the friction linings 22 which bears against the flywheel 14 corresponds to the unworn state of the friction linings 22.

In the thrust plate subassembly according to the invention, the prestressing force which is provided by the spring elasticity of the leaf spring element 36 may be set in such a way that, for each axial position of the leaf spring element 36, that is to say irrespective of the actual axial extent of the wear-adjusting device 28, it is greater than the prestressing force provided by the spring 33 for the wear-adjusting device 28. There is no need, in this case, to ensure a spring equilibrium between these two springs, since compensation of the wear is carried out until the adjusting ring 30 butts against the blocking portion 42 of the leaf spring element 36 again. The embodiment is preferably such that, in the working range, that is to say in the range between unworn friction linings and the maximum wear of the friction linings, the leaf spring element 36 has essentially the same bearing force on the adjusting ring 30. It is also possible to provide a decreasing bearing force of the leaf spring element 36.

It can be seen that, when wear compensation is being carried out, both the detaining element 52 and the adjusting ring 32 move in the same direction and approximately to the same extent. However, since the spring 60 is fixed with one end region to the detaining element 52 and with its other end region is fixed relative to the adjusting ring 32, the spring 60 therefore remains approximately in the same installation position, irrespective of wear-compensating operations being carried out, so that approximately the same prestressing force is provided for the detaining element 52 over the entire service life. Since the leaf spring element 36 rests on the wedge face 56 and, at the same time, a shear force counteracting the prestressing force of the spring 60 is exerted on the detaining element 52, it is advantageous if, as shown in FIG. 2, the detaining element 52 is designed in the region of its wedge face 56 with a gradation or toothing 62. Individual steps of a gradation 62 may then lie in each case parallel to the first wedge face 54, so that a shear force acting in the circumferential direction is not generated. In the case of a design as a toothing, a countertoothing may be provided on the blocking portion 42 of the leaf spring element 36, so that a positive engagement between the leaf spring element 36 and the detaining element 52 is provided here. In general, however, the wedge angle of the detaining element 52 is designed so that there is selflocking.

As illustrated in FIG. 3, the detaining element 52 may be designed as a structural part which has a limited circumferential extent. It is also possible, however, to design it as a ring element which in that case is designed, in the region of the leaf spring element 36, with respective wedgelike faces. It should be pointed out that a plurality of such leaf spring elements 36 may be provided, distributed over the circumference, and in that case may interact with corresponding detaining elements 52 or wedge faces of a ringlike detaining element. The leaf spring element 36 may also be replaced by a rigid element which is mounted radially on the inside on the pressure plate 16 so as to be pivotable about an axis of rotation lying in the circumferential direction and which is prestressed in the direction toward the ring 30 by a spring acting on the pressure plate 16, on the one hand, and the rigid element, on the other hand. If, in this case, this spring is designed as a helical tension spring extending essentially in the axial direction, it is then possible to ensure that, during the pivoting of the rigid element, the change in spring force occurring for each increase or change in the pivot angle is essentially always the same.

The detection portion 50 may, for example, also be a region located between the region where the leaf spring element 36 is mounted on the pressure plate and the blocking portion 52. In this case, it is necessary merely to arrange the interaction bolt radially within the wear-adjusting device 28. In this case, a corresponding passage orifice would have to be provided in the diaphragm spring 24.

On account of the eccentric design of the interaction bolt 46 in the region of the interaction portion 48, the interaction portion can be rotated between two positions in order to acquire transport protection. A first position is a position in which the interaction portion 48, which can be seen in FIG. 1, does not overlap with the detection portion 50. In this position, an axial displacement of the pressure plate 16 then cannot lead to the leaf spring element 36 lifting off from the wear-adjusting device 28. That is to say, in a transport state, before assembly together with the flywheel 14, undesirable "wear compensation" caused by the lifting off of the leaf spring element 36 from the adjusting ring 30 cannot be brought about. If the interaction bolt is then rotated into the position shown in FIG. 1 and fixed or locked on the housing 12 by means of a nut or the like, automatic wear compensation can be carried out by means of the leaf spring element 36 and the other components described above.

Figure 6:
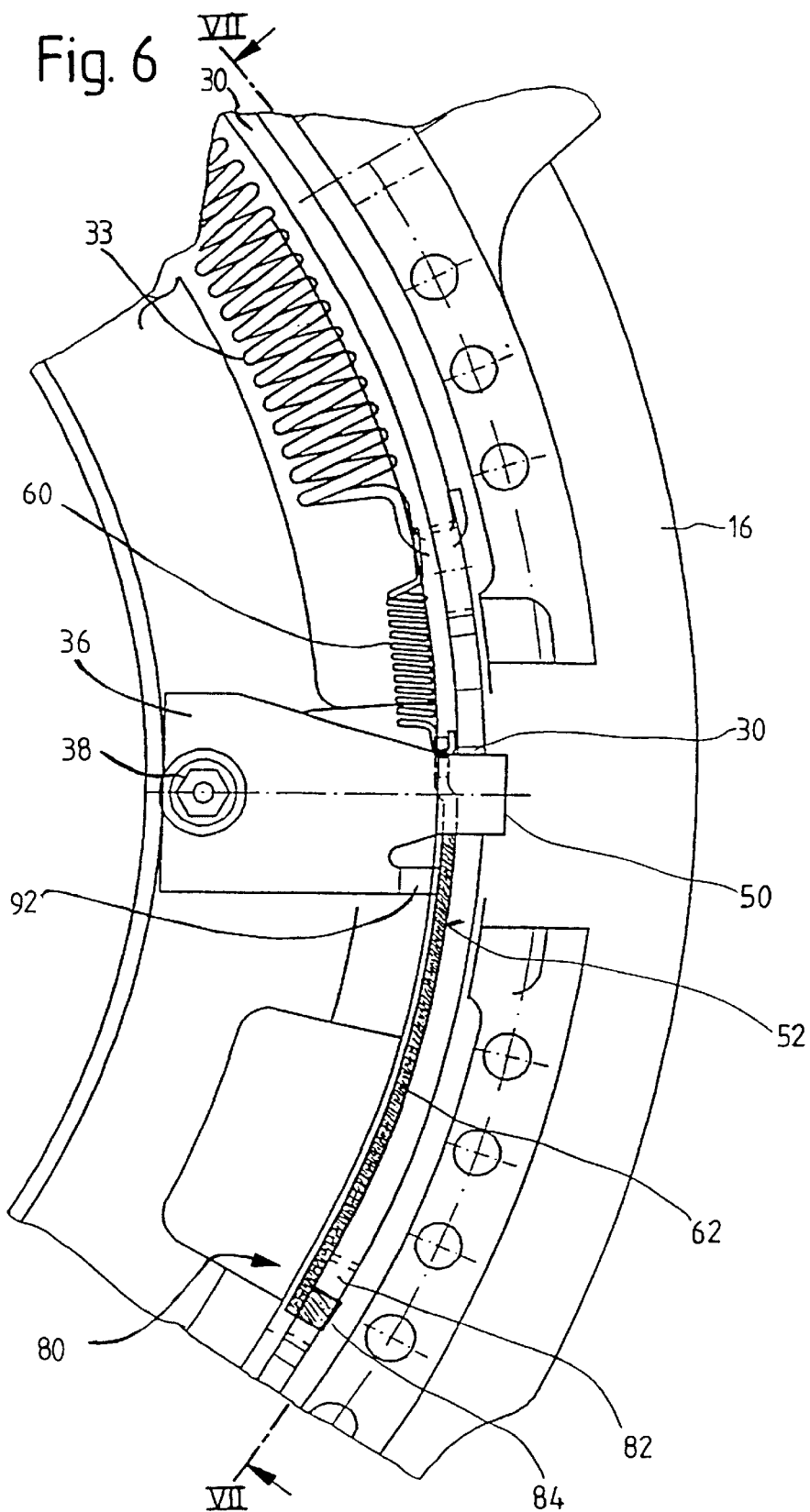
FIG. 6 shows an axial part view of a pressure plate, with an adjusting device provided on it, according to a further embodiment.
Figure 7:
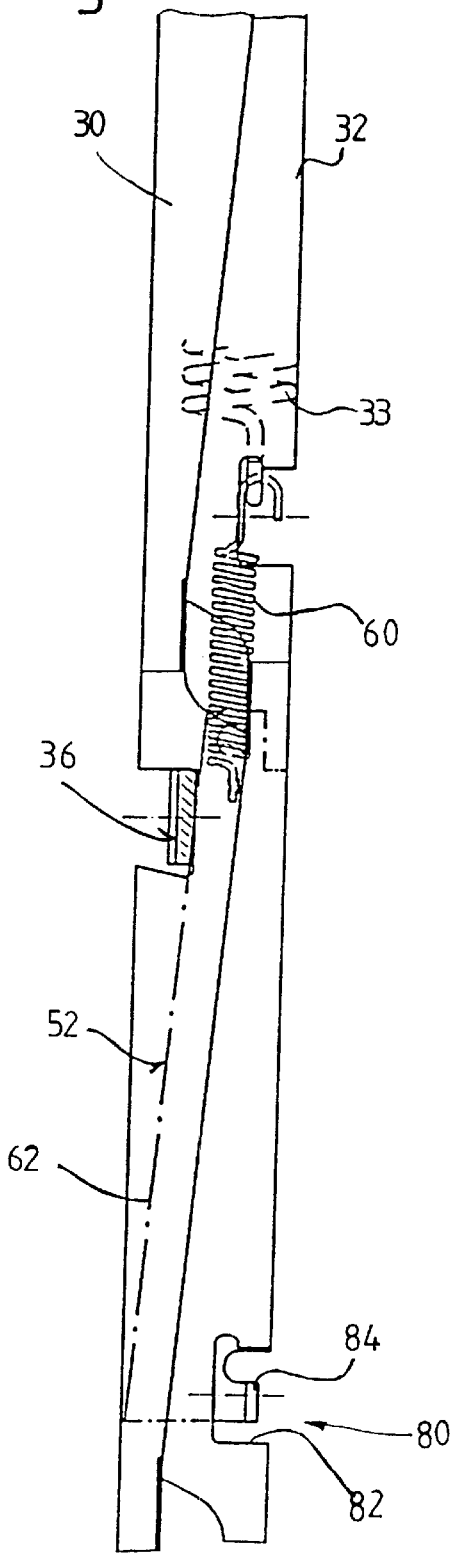
FIG. 7 shows a view of the adjusting device of FIG. 6 radially from outside.

FIGS. 6 and 7 show a development of the embodiment shown in FIGS. 1 to 3. Here, components corresponding to components described above are designated by the same reference symbol.

A maximum regulating-travel limiting arrangement 80 for the detaining element 52 can be seen in FIGS. 6 and 7. This arrangement 80 is formed by a circumferential recess 82 in the rotable adjusting ring 32, on the one hand, and a projection 84 engaging into this recess 82 and located on the detaining element 52, on the other hand, the circumferential extent of the projection 84 being smaller than a corresponding extent of the recess 82. Only a limited relative movement of the detaining element 52 relative to the adjusting ring 32 is therefore possible, the extent of this relative movement being greater than the relative movements occurring during normal operation, that is to say in the driving mode, between the detaining element 52 and the adjusting ring 32 on the occurrence of wear. However, an undesirable and excessive compensating movement is thereby prevented when maintenance work is carried out or when the thrust plate subassembly separated from the flywheel is being transported. Specifically, for example, if the thrust plate subassembly 10 is removed from the flywheel 14 and care is not taken to ensure that the leaf spring element 36 cannot butt against the interaction portion 48, the shifting movement which then occurs, induced by the diaphragm spring 24, leads to an axially directed displacement of the pressure plate 16 counter to the action of the force of the tangential leaf springs connecting the pressure plate 16 to the housing 12, at the same time the leaf spring element 36 butting against the interaction portion 48 and lifting off from the wear-adjusting device 28. Since, in this state, the wear-adjusting device 28 is blocked against undesirable adjustment by the action of the force of the tangential leaf springs (this adjustment can occur only in the driving mode, the vibrating movements then prevailing in the drive system inducing the relative movement of the adjusting ring which takes place in spite of the clamping force), the detaining element 52 is urged into the interspace, then produced between the leaf spring element 36 and the pressure plate 16, but is blocked against excessive movement due to the butting of the projection 84 against the circumferential edges of the recess 82. When the thrust plate subassembly 10 is assembled together with the flywheel 14, the leaf spring element 36 then moves again toward the adjusting device 28 or the detaining element 52 and, even before coming to bear against the adjusting ring 30, is blocked against further movement according to the shift of the detaining element 52 which has occurred. When the clutch is operated again, although wear compensation corresponding to this maximum possible regulating movement of the detaining element 52 is carried out, this wear compensation is nevertheless acceptable in terms of keeping the spring characteristics of the diaphragm spring 24 constant. It is important, however, that, when maintenance work or the like is carried out, the detaining element 52 cannot fill the entire interspace produced between the leaf spring element 36 and the pressure plate 16, which would result in an undesirably large compensating movement to be executed during subsequent operation. It is also apparent from FIG. 6 that a holding portion 92 is provided on the leaf spring element 36, that is to say the detection portion of the play indicator, said holding portion pressing against the detaining element 52 radially from inside and thus keeping the latter in bearing contact on the inner surface of the adjusting rings 30, 32. It is thus possible to prevent the detaining element 52 from being pulled somewhat radially inward due to the action of the spring 60, particularly when there is no centrifugal force action.

Figure 4:
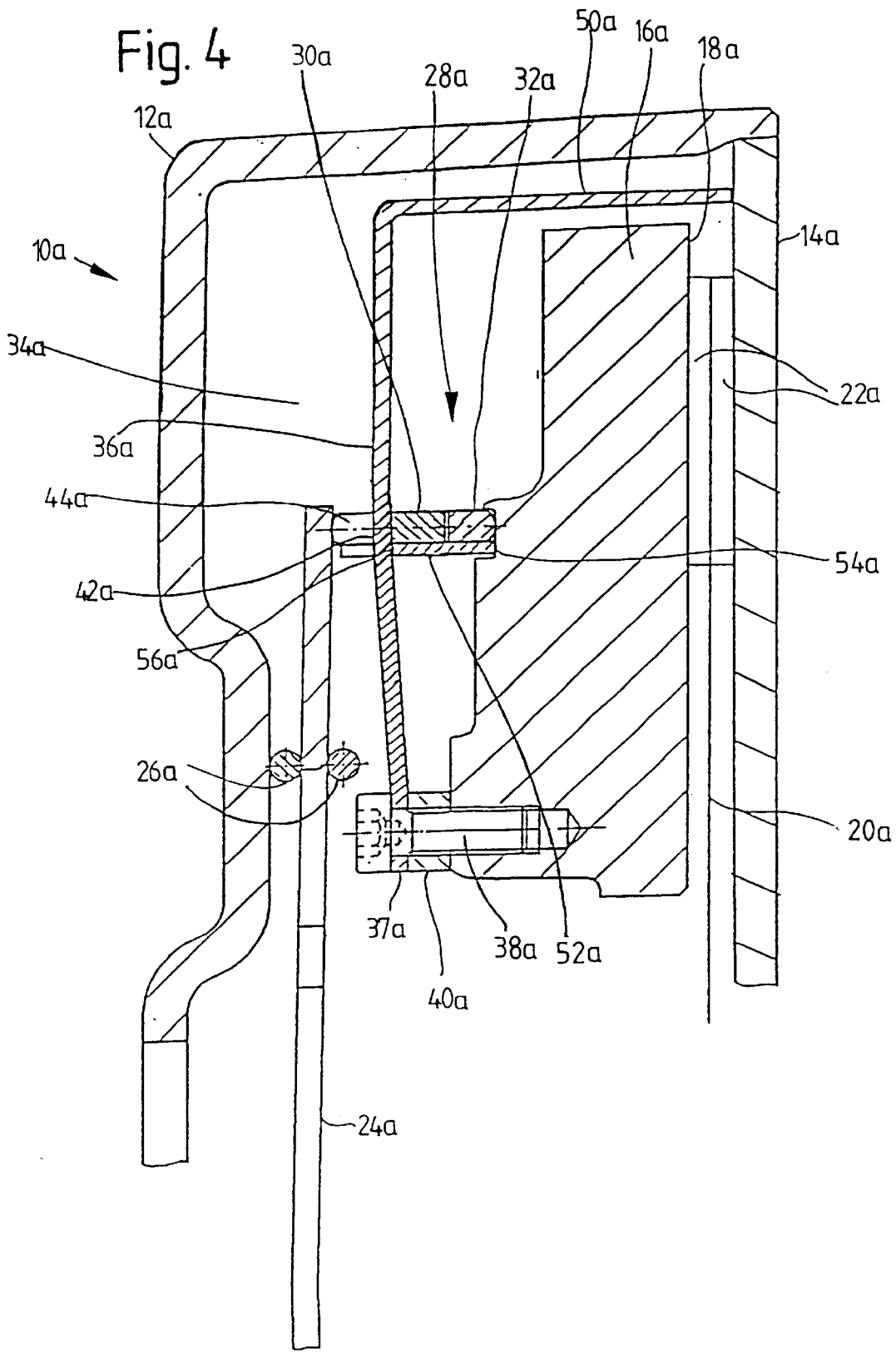
FIG. 4 shows a view, corresponding to that of FIG. 1, of an alternative embodiment of a thrust plate subassembly.

FIG. 4 shows an alternative embodiment of the thrust plate subassembly according to the invention. Components corresponding to above-described components in terms of construction or function are designated by the same reference symbol with the addition of the appendage "a". Essentially the differences in design from the embodiment according to FIGS. 1 to 3 are dealt with below.

It is apparent from FIG. 4 that the leaf spring element 36a is extended beyond its blocking portion 42a to beyond the outer circumferential edge of the pressure plate 16a and is bent there in the direction toward the flywheel 14a. An approximately axially extending portion then forms the detection portion 50a. This detection portion 50a comes to bear against the flywheel 14a on the occurrence of wear and a corresponding reduction in the axial extent of the friction linings 22a and leads to the situation where the leaf spring element 36a, in the region of its blocking portion 42a, cannot follow the movement of the pressure plate 16a and therefore of the wear-adjusting device 28a in the direction toward the flywheel 14a. When wear occurs, the blocking portion 42a once again lifts off from the ring element 30a and the detaining element 52a is displaced in the circumferential direction, in such a way that the detaining element 52a fills the increased clearance thus produced between the pressure plate 16a and the leaf spring element 36a in the region of the blocking portion 42a. Functioning when wear occurs and when wear compensation is carried out corresponds to that described above with reference to the embodiment of FIGS. 1 to 3.

Figure 5:
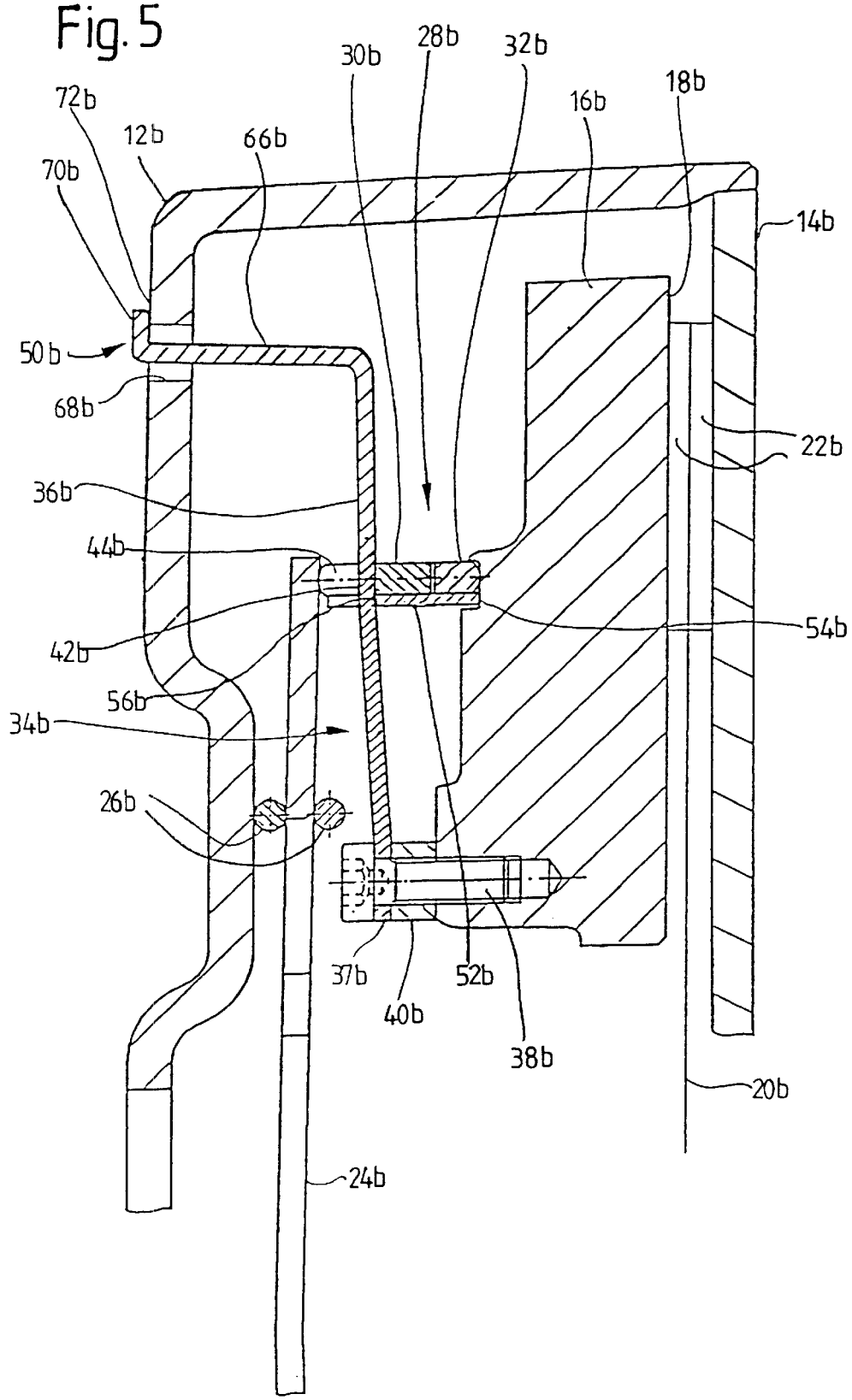
FIG. 5 shows a view, corresponding to that of FIG. 1, of a further alternative embodiment of the thrust plate subassembly according to the invention.

A further alternative embodiment of the thrust plate subassembly according to the invention is shown in FIG. 5. There, components corresponding to components described above with reference to FIGS. 1 to 3 are designated by the same reference symbol with the addition of the appendage "b". Once again, only the differences in design are dealt with below.

In the embodiment illustrated in FIG. 5, the leaf spring element 36b is once again extended radially outward beyond its blocking portion 42b acting on the ring element 30b and is bent in the direction away from the flywheel 14b. The leaf spring element 36b passes with this approximately axially extending bent portion 66b through an orifice 68b in the housing 12b. On the outside of the housing 12b, the leaf spring element 36b is once again bent approximately in the radial direction and with this bent portion 70b forms the detection portion 50b. The detection portion 50b engages behind the housing 12b on the outside, so that, in the surface region 72b surrounding the orifice 68b, the housing 12b forms the interaction portion, against which the leaf spring element 36b can come to bear with its detection portion 50b when wear of the friction linings 22b occurs. When such bearing contact and a continuing movement of the pressure plate 16b toward the flywheel 14b take place, the leaf spring element 36b is once again lifted off with its detection portion 42b from the adjusting ring 30b, as already described above. Functioning for compensating the wear corresponds once again to that described above.

In the embodiment according to FIG. 5, it is likewise possible for the leaf spring element 36b to extend only radially outward and to pass through or engage into an orifice provided in the approximately axially extending wall portion of the housing 12b.

Figure 8:
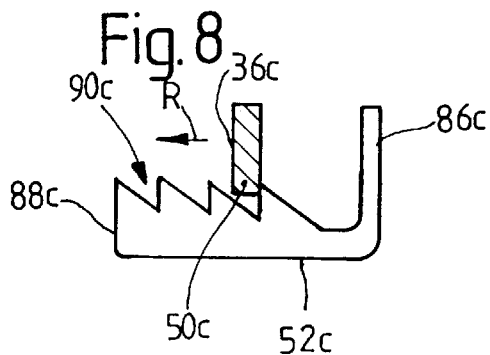
FIG. 8 shows a simplified view of a further embodiment according to the invention of a detaining element.

FIG. 8 shows an alternative embodiment of a detaining element 52c which can come into detaining interaction with the leaf spring element 36c. The detaining element 52c is of angular design, with a first angle leg 86c, which can be fixed, for example, to the pressure plate, and a second angle leg 88c, which carries a sawtooth-like toothing 90c on a side facing the leaf spring element 36c. In this case, the sawteeth are oriented in such a way that they allow a relative shift, occurring during wear, of the leaf spring element 36c in the direction of an arrow R in FIG. 8, but prevent a backward movement in the opposite direction to the arrow R. For example, for this purpose, the detaining element 52c may be designed spring-elastically and, when the leaf spring element 36c engaging into the toothing 90c moves in the direction R, is displaced by the sloping flanks of the teeth and, after a slope has been passed, springs back into the position illustrated in FIG. 8. This always makes it possible to prevent the situation where, once wear has occurred, resulting in a corresponding deflection of the leaf spring element 36c, the spring element 36c returns to its original position when a clutch disengagement operation has been executed, with the result that desired wear compensation can be carried out.

Figure 11:
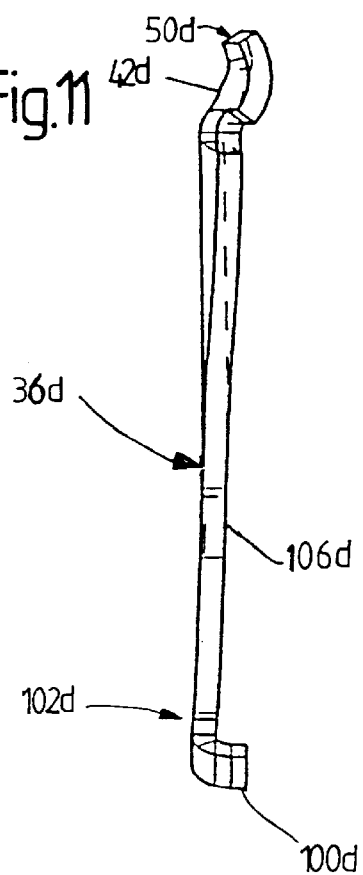
FIG. 11 shows a side view of a blocking/detection element used in the embodiment according to FIGS. 9 and 10.
Figure 9:
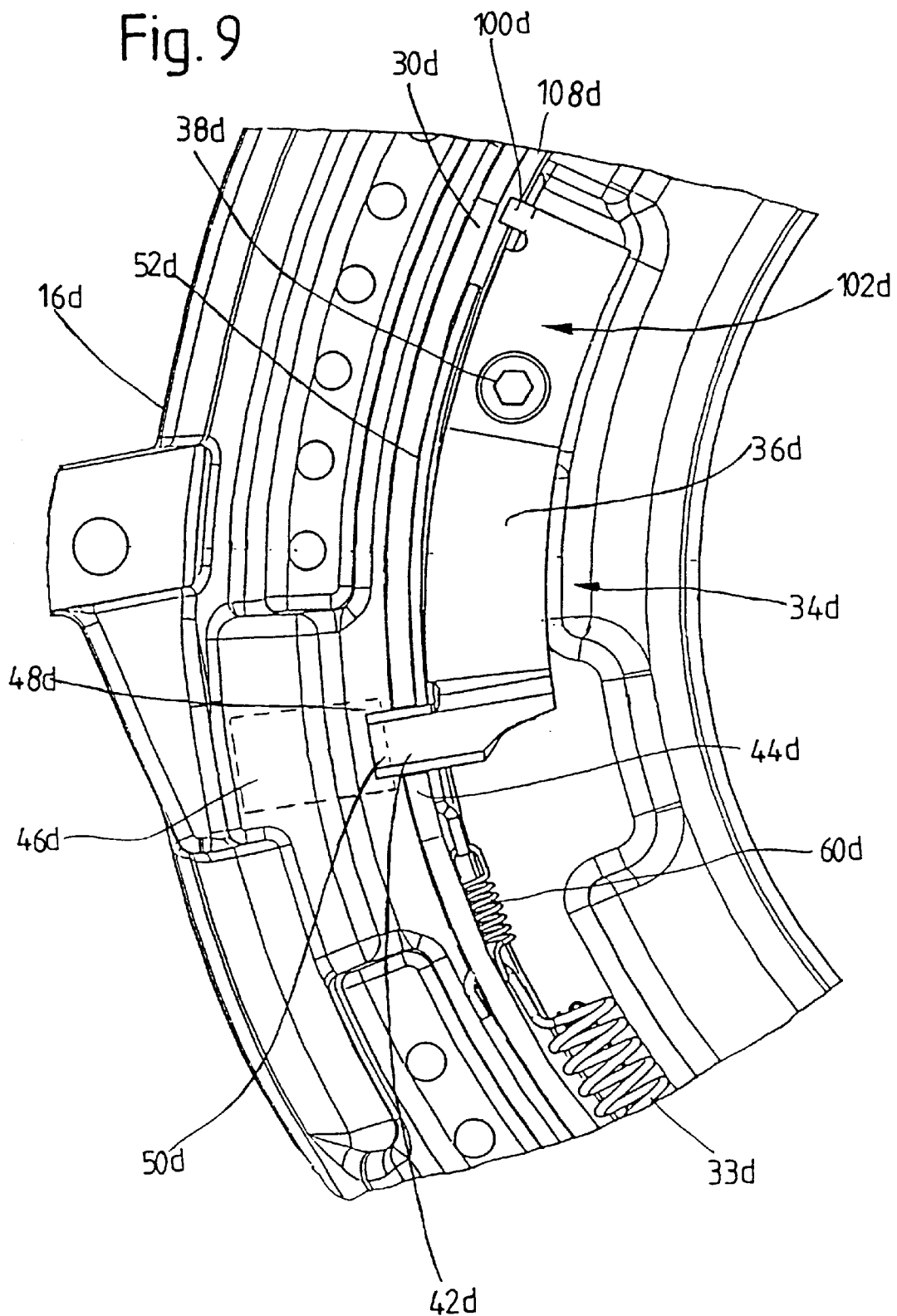
FIG. 9 shows a top view of a pressure plate, with a wear-adjusting device and a detaining element, according to a further alternative embodiment.
Figure 10:
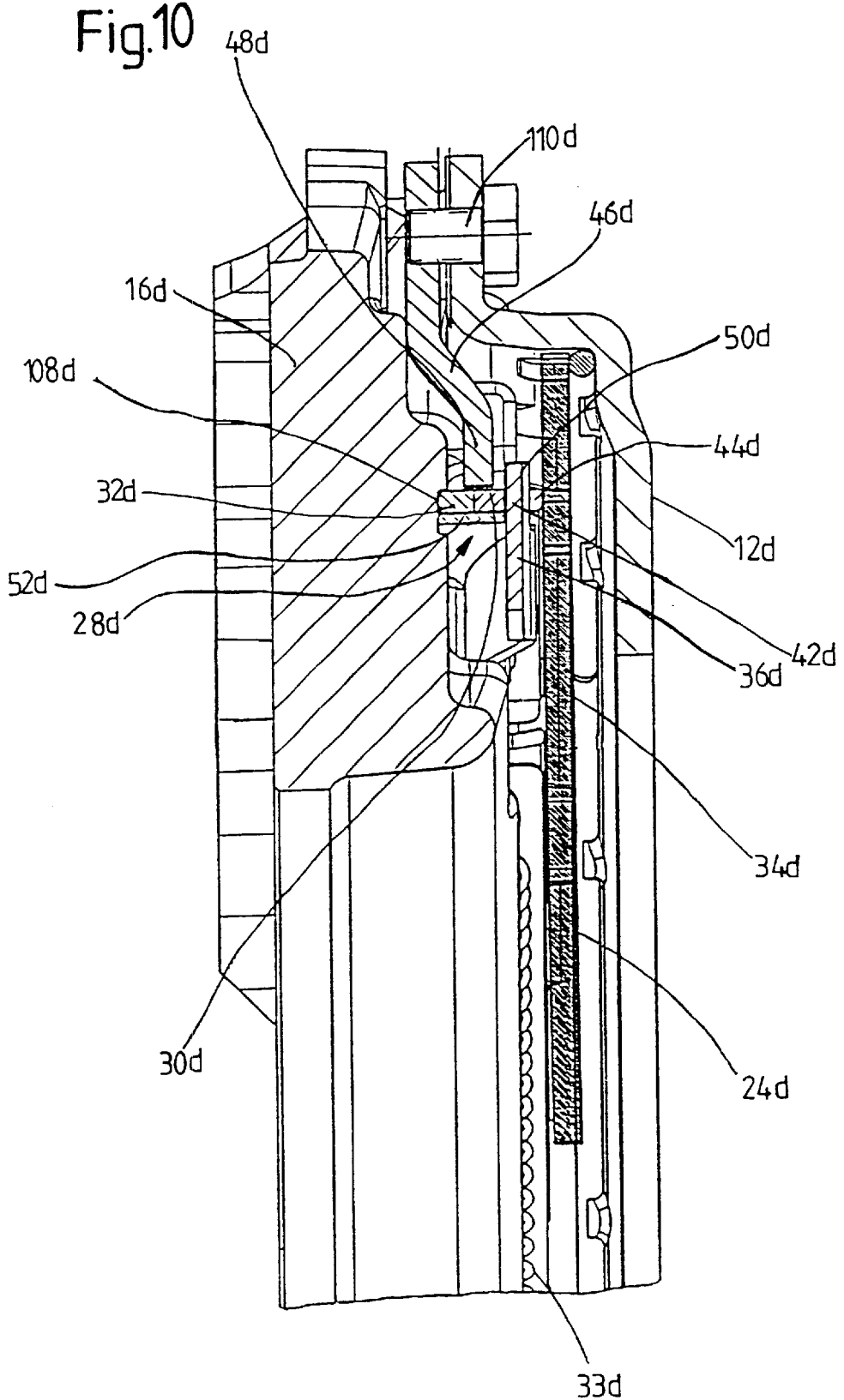
FIG. 10 shows a part view in longitudinal section of the embodiment illustrated in FIG. 9.
Figure 12:
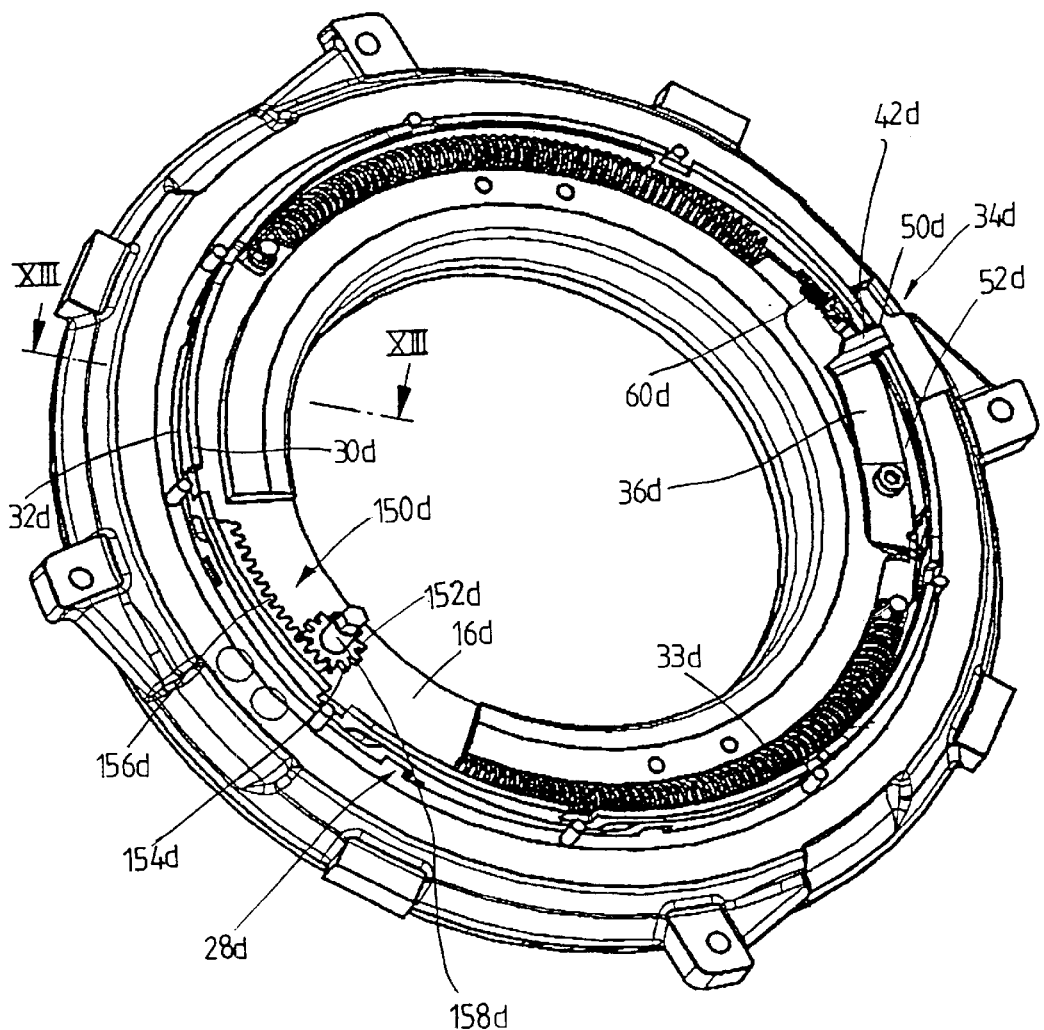
FIG. 12 shows a perspective view of a thrust plate subassembly, such as is shown in FIGS. 9 and 10, but with the housing omitted and the diaphragm spring omitted, in which a resetting arrangement can additionally be seen.
Figure 13:
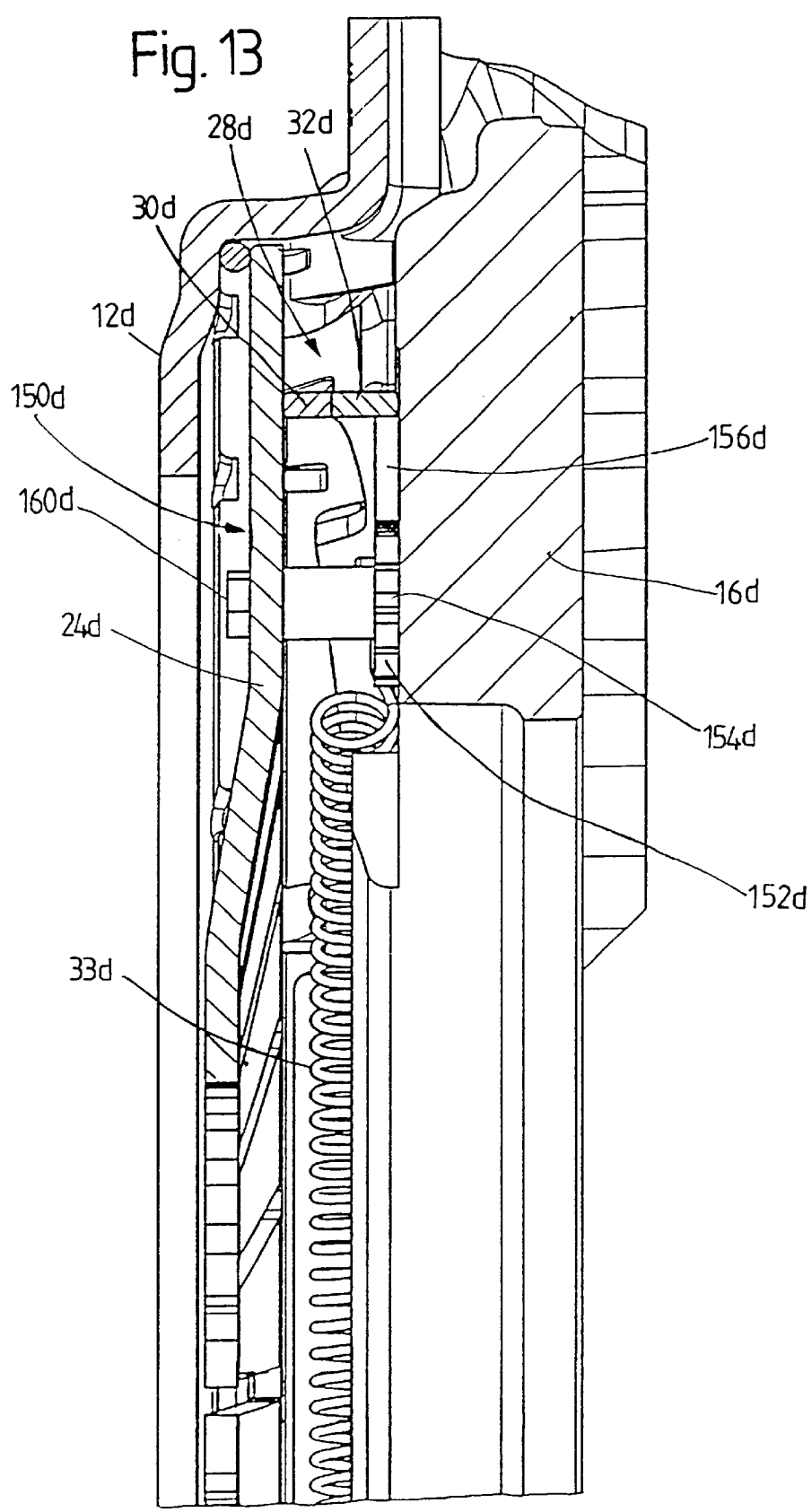
FIG. 13 shows a sectional view along a line XIII—XIII in FIG. 12.
Figure 14:
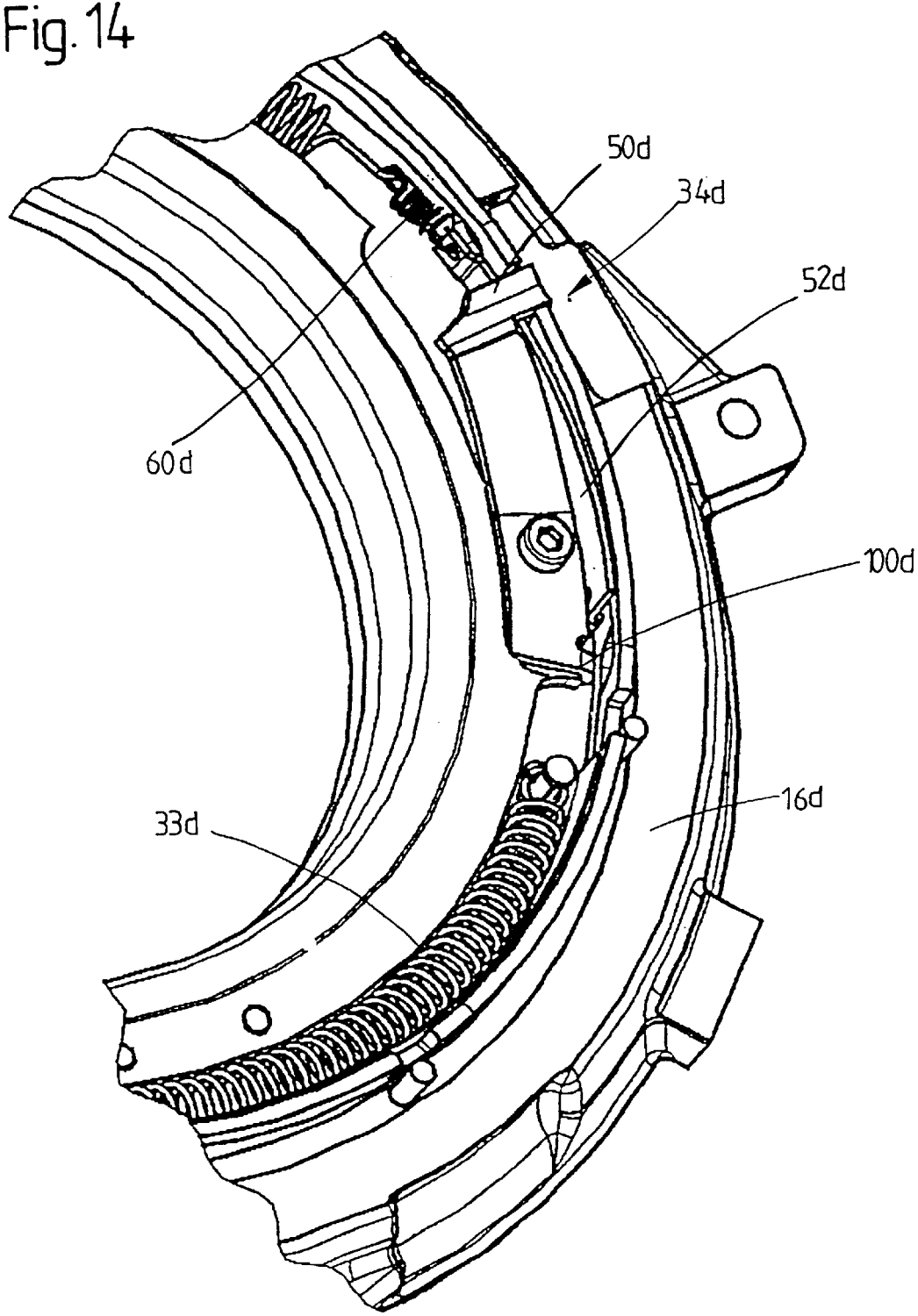
FIG. 14 shows an enlarged view of a detail of the illustration of FIG. 12 in the region of the detaining element.
Figure 15:
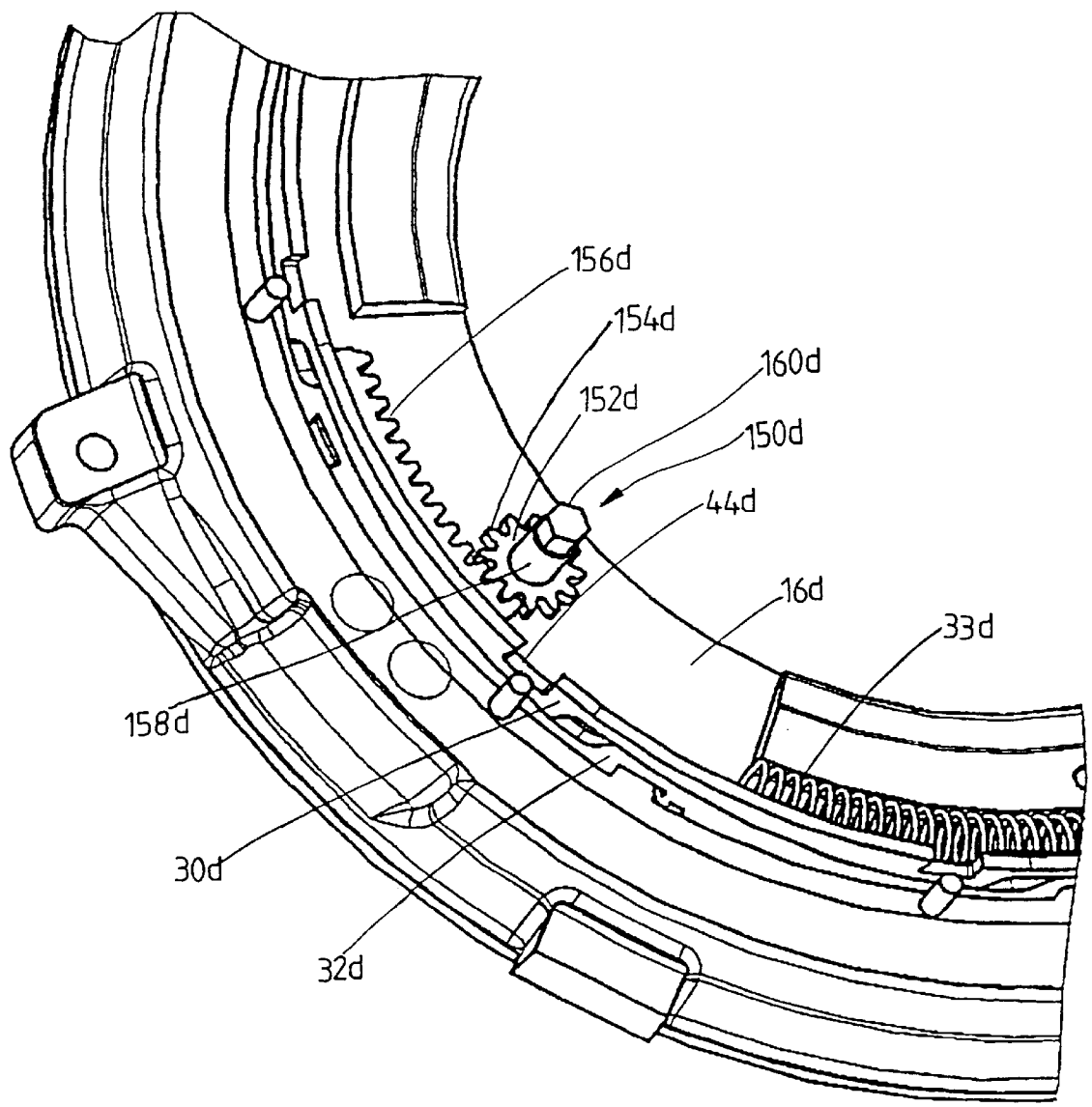
FIG. 15 shows an enlarged part view of the illustration of FIG. 12 in the region of the resetting arrangement.
Figure 16:
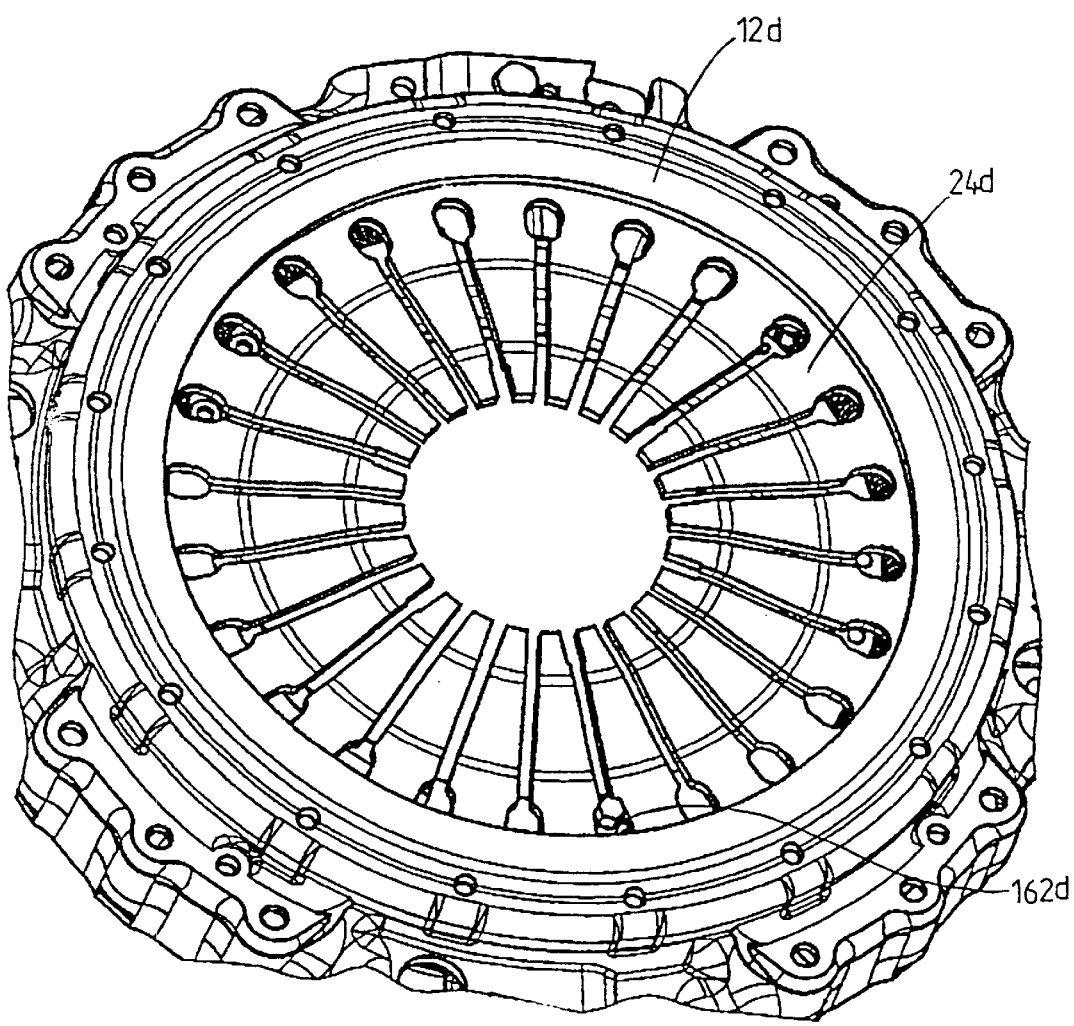
FIG. 16 shows a view, corresponding to that of FIG. 12, of the thrust plate subassembly with diaphragm spring.

A further embodiment of a thrust plate subassembly according to the invention is illustrated in FIGS. 9–11. An essential difference from the embodiments described above is that the leaf spring element 36d shown, which here forms a blocking/detection element, extends essentially in the circumferential direction, whereas the main direction of extent was previously essentially radial. That is to say, as can be seen particularly in FIGS. 9 and 10, the leaf spring element 36d is screwed with an end region 102d to the pressure plate, for example by means of a screw bolt 38d, and then extends in the circumferential direction. In its other end region 104d, a radial projection is provided, starting from a basic body portion 106d. The projection first forms the blocking portion 42d resting on the adjusting ring 30d and then, radially further outward, forms the detection portion 50d which can come to bear against a counterelement 46d fixed to the housing 12d when, on the occurrence of wear, the pressure plate 16d is moved axially toward the flywheel and away from the housing. It can be seen that, here, the counterelement 46d is fixed, for example by means of a screw bolt 110d, to one side, facing the flywheel, of a radially outwardly projecting flangelike portion of the housing 12d and extends radially inward, as also indicated in FIG. 9 by a dashed line.

By the positioning of the leaf spring element 36d on the inside of the adjusting rings 30d, 32d and so as to extend in the circumferential direction, the central orifice provided in the pressure plate can be made larger, so that more construction space is available for other components, for example a torsional vibration damper on a clutch disk. The leaf spring element 36d nevertheless reaches with the blocking portion 42d and the detection portion 50d radially outward beyond the adjusting rings 30d, in order to interact with a housing-side component for wear detection and wear compensation. In the embodiment according to FIGS. 9–11, too, the detaining element 52d is, for example, of wedgelike design and is prestressed by the prestressing spring 60d in a direction in which, after the blocking portion 42d has lifted off from the adjusting lit ring 30d, the detaining element can enter the interspace produced and can thus block the leaf spring element in its end region 104d against backward movement in its prestressing direction.

It can be seen from FIG. 10 that, starting from the point where it is fixed to the pressure plate 16d, the leaf spring element 36d is axially deformed elastically in order to generate a prestressing force for the adjusting device 28d. In order to increase this prestressing force even further, the leaf spring element 36d has, in its detensioned state shown in FIG. 11, a predeformation or preshaping in the opposite direction, that is to say a curvature opposite to the intended bending direction may be provided, and the leaf spring element 36d may be twisted along its longitudinal axis, so that, in particular, the blocking portion 42d and the detection portion 50d are likewise prestressed and predeformed in a direction opposite to the deformation which subsequently occurs.

It can be seen from FIG. 9 that, in the end region 102d, the leaf spring element 36d has a securing projection 100d which is produced, for example, by the bending round of a tab formed during punching out. This securing projection 100d engages into a circumferential groove 108d, in which, on the one hand, the adjusting ring 32d is guided and, on the other hand, the detaining element 52d is received. Rotation securing is provided for the leaf spring element 36d in this way, even though only a single detaining screw 38d is used for reasons of cost and weight.

Since, in all the embodiments described above, the detaining element is arranged directly next to the wear-adjusting device, this ensures that the detaining element comes into interaction with that region of the leaf spring element in which the leaf spring element has the blocking portion. That is to say, the position provided for the leaf spring element by the detaining element after wear has occurred corresponds exactly to that position which the leaf spring element should have in the region of its blocking portion for subsequent wear compensation. This, too, contributes to highly accurate compensation of the wear detected.

A development of the embodiment described above particularly with reference to FIGS. 9–11 is illustrated in FIGS. 12–16. In the thrust plate subassembly shown there, the wear-adjusting device 28d is assigned a resetting arrangement 150d, by means of which, for example when a worn clutch disk is replaced, the wear-adjusting arrangement 28d, that is to say the adjusting ring 32d, can be brought into a position which is assigned to a corresponding unworn state of the clutch disk, in order thereby to cancel again the wear compensation which was previously carried out and took place as a result of the axial expansion of the wear-adjusting device 28d. It can be seen, particularly in FIGS. 12 and 13, that the resetting arrangement 150d has a resetting gearwheel 152d which is carried on the pressure plate 16d so as to be rotable about an axis essentially parallel to the axis of rotation of the thrust plate subassembly. The toothing 154d of the gear wheel 152d is in meshing engagement with a toothing portion 156d which extends in the circumferential direction and which, in turn, is connected fixedly to the adjusting ring 32d or is formed integrally with the adjusting ring 32d. Connected fixedly to the driving gearwheel 152d is a pinlike portion 158d which engages with its end region 160d remote from the driving gearwheel 152d through an associated orifice 162d in the diaphragm spring 24d. This orifice 162d lies radially within that region which is covered by the housing 12d, so that the end region 160d is accessible from outside, with the thrust plate subassembly assembled. In the end region 160d, the pinlike portion 158d has a tool engagement formation, for example a hexagonal configuration, a hexagon socket configuration or the like, so that action can be taken by means of a corresponding tool on the pinlike portion 158d and therefore the driving gearwheel 152d in order to rotate the driving gear wheel 152d. Such a rotation induces a corresponding rotation of the adjusting ring 132d.

If, therefore, during a maintenance operation, a clutch disk which is completely or virtually completely worn is replaced, then, as a result of the rotation of the driving gearwheel 152d and the corresponding rotation of the adjusting ring 32d, the adjusting ring 32d, starting from the initial position, which is ultimately that position of the adjusting ring 32d which the adjusting ring 32d assumes when maximum possible wear compensation has taken place, is moved, opposite to that direction in which the adjusting ring moves when wear compensation is carried out, back into a position which the adjusting ring 32d assumes when the associated clutch disk has lower wear. This may, for example, be a position of the adjusting ring 32d which the latter assumes when the clutch is in the new state. Since the relative movement of the two adjusting rings 30d, 32d is possible only when these are not clamped between the diaphragm spring and the driving plate, care must be taken, before a resetting operation of this kind is carried out, to ensure that either action by the diaphragm spring 24d is canceled, that is to say the diaphragm spring 24d is brought relative to the housing 12d essentially into a position corresponding to a clutch disengagement position, or it is necessary to ensure that there is no force on the pressure plate which counteracts the action caused by the diaphragm spring 24d, that is to say resetting could be carried out when the thrust plate subassembly is separated from the flywheel and therefore the pressure plate is essentially free.

Since, when a resetting operation is carried out in this way by means of the resetting arrangement 150d, the entire clutch is to be brought again into a functionable state in which the clutch has a functional or operative characteristic which corresponds to the state of a new clutch. Care must also be taken to ensure that the detaining element 52d is brought into a corresponding position which the latter assumes when the clutch is in a state of lower wear. If this were not to take place, the detaining element 52d would continue to block the play indicator 34d in the form of the leaf spring element 36d, counter to its prestressing force, in a position which corresponds to a state of greater wear. If the wear-adjusting device 28d were released resiliently, it would be moved again directly, due to the prestressing force generated by the spring 32d, into a state which corresponds to the wear state previously assumed. In the thrust plate subassembly according to the invention, however, care is taken to ensure that, together with the resetting of the adjusting ring 32d, the detaining element 52d is also brought into a position which the detaining element 52d assumes in a state of lower wear of the thrust plate subassembly. This is carried out by means of the projection 84, described with reference to FIG. 7, which engages into the associated recess 82 of the adjusting ring 32. A corresponding configuration is also provided in the case of the detaining element 52d of FIGS. 9–16. Hence, when the adjusting ring 32d is shifted in the resetting direction, it at the same time, due to the butting of the projection 84 against a lateral wall of the recess 82, takes up the detaining element 52d in a direction in which the spring 60d prestressing the detaining element 52d is tensioned again and the detaining element 52d assumes a position which it assumes in a state of lower wear, for example in the new state or virtually in the new state of the clutch. In order, here, to bring this detaining element 52d into the desired position as accurately as possible, it is advantageous to keep the play of the projection 84 in the recess 82 as small as possible. The backward movement of the detaining element into a state which corresponds to lower wear also ensures that the play indicator 34*d* in the form of the leaf spring element 36*d* is brought back into a position which the latter assumes when the clutch is in the state of lower wear. That is to say, since, after resetting has been carried out, a portion of smaller axial extent of the detaining element 52*d* is located in the region of the leaf spring element 36*d*, the leaf spring element 36*d* can, by virtue of its own prestress, move nearer to the pressure plate 16*d* again and, in this position, then block the adjusting rings 32*d*, 30*d* against relative rotation, when no wear has occurred.

It is apparent from the foregoing description that, as a result of the actuation of the resetting arrangement 150*d*, all the components of the thrust plate subassembly according to the invention which are relevant to wear compensation can be brought again into the position which corresponds to a state of lower wear, for example a new state. This therefore relates both to the adjusting device 28*d* in the form of the two adjusting rings 30*d*, 32*d* and to a respective play indicator, here in the form of a leaf spring element 36*d*, and also to a detaining element 52*d* assigned to a respective play indicator 36*d*. Since there is interaction between these individual portions, there is no need for the resetting arrangement 150*d* to be designed in such a way that it acts separately on each of these individual relevant portions.

It should be pointed out that the resetting arrangement may have widely varying configurations different from the embodiment illustrated. Thus, it would also be conceivable, in principle, to arrange the driving wheel on the pressure plate so as to be rotable about an axis essentially orthogonal to the axis of rotation of the thrust plate subassembly, for example in a slotlike recess, and to cause it to mesh with a toothing portion of the adjusting ring. This toothing portion could then be arranged on that axial side of the adjusting ring 32*d* which faces the pressure plate, in which case the driving gearwheel or the slotlike recess receiving the latter would then have to be in axial alignment with the adjusting ring 32*d*. Access could then take place through the pressure plate, for example via a bore running radially outward. It would also be conceivable, nevertheless, to arrange the driving gearwheel radially inside or radially outside in a slotlike recess or in another positioning, with the axis of rotation pointing radially, on the pressure plate. Even in the type of positioning illustrated, with the actuating axis of the driving gearwheel parallel to the axis of rotation, it is possible for said driving gearwheel to be positioned radially outside the adjusting rings 30*d*, 32*d*.

It should also be pointed out, furthermore, that, even when the adjusting rings are divided into a plurality of segments, resetting of this kind may be carried out, specifically, in that case, for each of these segments themselves. Even when only a single adjusting ring is provided, which is shifted on wedge faces of the pressure plate, resetting can be carried out by action on this single adjusting ring.

Embodiments were described above in which the wear-adjusting device comprises two annular elements, one of which is prestressed in the wear-adjusting direction, that is to say for rotation in the circumferential direction. It is likewise possible for the wear-adjusting device to comprise only a single ring element which is prestressed for movement in the wear-adjusting direction, that is to say for rotation in the circumferential direction, and can slide with its oblique faces on complementary oblique faces of the pressure plate and/or of the diaphragm spring itself. It is also possible, correspondingly, to provide individual wedge elements which can be displaced by spring prestress either in the circumferential direction or in the radial direction and at the same time can slide on wedge counterfaces either of the pressure plate or diaphragm spring or of a further wedge element. If individual wedge elements are provided, it is important for each wedge element or each pair of wedge elements to be assigned a leaf spring element in each case. Furthermore, the thrust plate subassembly having the construction according to the invention may be designed both for a press-action and a pull-action clutch. It is also possible to arrange the wear-adjusting device between the diaphragm spring and the housing. In this case, the leaf spring element, too, is to be mounted on the housing and the wear can be detected, for example, relative to the pressure plate.

The invention is not limited by the embodiments described above which are presented as examples only but can be modified in various ways within the scope of protection defined by the appended patent claims.

I claim:

1. A thrust plate subassembly, comprising:
   a housing fixable to a flywheel for joint rotation about an axis of rotation;
   a pressure plate arranged essentially fixedly in terms of rotation in the housing and axially displaceable relative to the housing;
   a force accumulator supported on the housing and on the pressure plate so as to press the pressure plate in a direction of a side of the housing which is provided for connection to the flywheel;
   a wear-adjusting device arranged in a support path of the force accumulator between the force accumulator and one component of the housing and the pressure plate and having at least one adjusting element displaceable for wear compensation and prestressed in a wear-adjusting direction;
   at least one play indicator arrangement for detecting wear of friction linings of a clutch disk clampable between the pressure plate and the flywheel, the play indicator arrangement comprising:
   a blocking/detection element mounted on the one component and prestressed with a blocking portion against the wear-adjusting device so as to act upon the wear-adjusting device in order to prevent movement of the at least one wear-adjusting element in the wear-adjusting direction; and a detection portion that is bringable into interaction with an other component displaceable relative to the one component on the occurrence of wear for detecting the wear, on the occurrence of wear the blocking/detection element being capable of being brought, as a result of the interaction with the other component, into a position for releasing the at least one adjusting element for purposes of movement in the wear-adjusting direction;
   a detaining element configured and arranged so that when the blocking/detection element is brought into a position for releasing the at least one adjusting element, the blocking/detection element is capable of being detained against movement in its prestressing direction; and
   resetting means for bringing the wear-adjusting device into a position which corresponds to a state of lower wear.

2. A thrust plate subassembly as defined in claim 1, wherein the force accumulator is a diaphragm spring.

3. A thrust plate subassembly as defined in claim 1, wherein the blocking/detection element is mounted essentially fixedly in one end region on the one component and is prestressed by spring force against the wear-adjusting device.

4. A thrust plate subassembly as defined in claim 1, wherein the blocking/detection element is a spring element.

5. A thrust plate subassembly as defined in claim 4, wherein the blocking/detection element is a leaf spring element.

6. A thrust plate subassembly as defined in claim 1, wherein the detaining element is prestressed in a direction for detaining the blocking/detection element.

7. A thrust plate subassembly as defined in claim 1, wherein the detaining element is of essentially wedgelike design having a first wedge face supported on the one component and a second wedge face that detains the blocking/detection element.

8. A thrust plate subassembly as defined in claim 1, wherein the detaining element comprises a catch element with catch projections which prevents a movement of the blocking/detection element in its prestressing direction and allows a movement opposite to the prestressing direction.

9. A thrust plate subassembly as defined in claim 8, wherein the catch projections are a sawtooth toothing.

10. A thrust plate subassembly as defined in claim 1, wherein the one component comprises the pressure plate.

11. A thrust plate subassembly as defined in claim 10, wherein the other component comprises the housing.

12. A thrust plate subassembly as defined in claim 11, wherein the housing has an interaction portion arranged so that the detection portion of the blocking/detection element comes to bear against the interaction portion on the occurrence of wear.

13. A thrust plate subassembly as defined in claim 12, wherein the interaction portion is formed by a surface region of the housing.

14. A thrust plate subassembly as defined in claim 10, wherein the housing has an interaction element mounted on it which has an interaction portion for interacting with the detection portion.

15. A thrust plate subassembly as defined in claim 14, wherein the interaction element is capable of being arranged on the housing in a first position, in which the interaction portion cannot come into interaction with the detection portion, and of being arranged in a second position, in which the interaction portion can come into interaction with the detection portion.

16. A thrust plate subassembly as defined in claim 10, wherein the other component comprises the flywheel.

17. A thrust plate subassembly as defined in claim 1, and further comprising a maximum regulating-travel limiting arrangement for the detaining element.

18. A thrust plate subassembly as defined in claim 17, wherein the maximum regulating-travel limiting arrangement comprises a blocking element on the detaining element and a counterblocking element on the at least one wear-adjusting element.

19. A thrust plate subassembly as defined in claim 18, wherein the blocking element is a blocking projection on the detaining element and the counterblocking element is a blocking recess in the at least one wear-adjusting element.

20. A thrust plate subassembly as defined in claim 1, wherein the blocking/detection element is arranged so as to extend essentially radially.

21. A thrust plate subassembly as defined in claim 20, wherein the blocking/detection element is mounted with a radially inner region on the one component and in a radially outer region has at least one of the detection portion and the blocking portion.

22. A thrust plate subassembly as defined in claim 1, wherein the blocking/detection element is arranged so as to extend essentially in a circumferential direction.

23. A thrust plate subassembly as defined in claim 22, wherein the blocking/detection element is mounted in a first circumferential end region on the one component and has at least one of the detection portion and the blocking portion in a second circumferential end region.

24. A thrust plate subassembly as defined in claim 23, wherein the blocking/detection element has a basic body portion which extends essentially in the circumferential direction and from which at least one of the detection portion and the blocking portion projects essentially radially in the second circumferential end region.

25. A thrust plate subassembly as defined in claim 1, and further comprising a rotation securing arrangement for securing the blocking/detection element against rotation relative to the one component.

26. A thrust plate subassembly as defined in claim 25, wherein the rotation securing arrangement comprises a securing portion which is provided on one end region of the blocking/detection element so as to interact with a counter-securing portion on the one component.

27. A thrust plate subassembly as defined in claim 1, wherein the resetting means is operative to bring the at least one adjusting element out of an initial position in a resetting direction into a position which corresponds to a state of lower wear than the initial position.

28. A thrust plate subassembly as defined in claim 27, wherein the initial position is one of a wear position of the at least one adjusting element which the adjusting element assumes when a maximum possible wear is present, and a position in a region of the wear position.

29. A thrust plate subassembly as defined in claim 27, wherein the at least one adjusting element is configured and arranged to be moveable by the resetting means into a wear-free position which the adjusting element assumes when there is one of no and essentially no wear.

30. A thrust plate subassembly as defined in claim 27, wherein the resetting means includes at least one driving element which is capable of being set in movement by a driving member, and the movement of which is convertible into a resetting movement of the at least one adjusting element.

31. A thrust plate subassembly as defined in claim 30, wherein the at least one adjusting element has an engagement formation which is in driving contact with a counterengagement formation on the at least one driving element.

32. A thrust plate subassembly as defined in claim 31, wherein the engagement formation is a toothing and the counterengagement formation is a toothing.

33. A thrust plate subassembly as defined in claim 31, wherein the at least one adjusting element is an adjusting ring which has a toothing at least in a region of the at least one driving element, and wherein the at least one driving element comprises a driving gearwheel meshing with the toothing of the adjusting ring.

34. A thrust plate subassembly as defined in claim 30, wherein the at least one driving element is carried on the one component.

35. A thrust plate subassembly as defined in claim 30, wherein the at least one driving element has a tool engagement formation accessible from outside the thrust plate subassembly.

36. A thrust plate subassembly as defined in claim 1, wherein the resetting means is operative to bring the detaining element into a position of the detaining element which is assigned essentially to that position of the wear-adjusting device which the wear-adjusting device assumes after a resetting operation has been carried out.

37. A thrust plate subassembly as defined in claim 36, wherein, during the movement of the at least one adjusting element in the resetting direction, the detaining element is movable by means of the at least one adjusting element.

38. A thrust plate subassembly as defined in claim 37, wherein at least one of the at least one adjusting element and the detaining element has a take-up projection which engages with movement play in one of the adjusting direction and the resetting direction into a take-up recess of the other of the adjusting element and the detaining element in each case.

39. A thrust plate subassembly as defined in claim 1, wherein the at least one play indicator arrangement is configured and arranged to be bringable by means of the resetting means into a position which corresponds to a state of lower wear.

40. A thrust plate subassembly as defined in claim 1, wherein the at least one play indicator arrangement is configured and arranged to be bringable by means of the resetting means into a position which corresponds to a state of lower wear, the resetting means being operative to cancel detention of the blocking/detection element against movement in its prestressing direction.

* * * * *